United States Patent
Sun et al.

(10) Patent No.: US 10,237,031 B2
(45) Date of Patent: Mar. 19, 2019

(54) METHOD AND APPARATUS FOR SENDING INFORMATION, AND METHOD AND APPARATUS FOR RECEIVING INFORMATION

(71) Applicant: HUAWEI TECHNOLOGIES CO., LTD., Shenzhen, Guangdong (CN)

(72) Inventors: Jingyuan Sun, Shenzhen (CN); Qiang Li, Beijing (CN); Yongxing Zhou, Beijing (CN); David jean-marie Mazzarese, Beijing (CN); Yan Cheng, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 197 days.

(21) Appl. No.: 15/255,888

(22) Filed: Sep. 2, 2016

(65) Prior Publication Data

US 2016/0373227 A1 Dec. 22, 2016

Related U.S. Application Data

(63) Continuation of application No. PCT/CN2014/072812, filed on Mar. 3, 2014.

(51) Int. Cl.
*H04H 20/71* (2008.01)
*H04L 5/00* (2006.01)
(Continued)

(52) U.S. Cl.
CPC ............ *H04L 5/0048* (2013.01); *H04L 5/005* (2013.01); *H04L 5/0094* (2013.01); *H04L 12/18* (2013.01);
(Continued)

(58) Field of Classification Search
CPC ..... H04L 5/0048; H04L 5/005; H04L 5/0044; H04L 5/0094; H04L 12/18; H04L 27/2607

See application file for complete search history.

(56) References Cited

U.S. PATENT DOCUMENTS

| 8,842,594 B2 | 9/2014 | Jiang et al. |
| 9,768,930 B2 * | 9/2017 | Park .................... H04L 5/0014 |

(Continued)

FOREIGN PATENT DOCUMENTS

| CN | 101534285 A | 9/2009 |
| CN | 101594336 A | 12/2009 |

(Continued)

OTHER PUBLICATIONS

Japanese Office Action dated Nov. 21, 2017 in corresponding Japanese Patent Application No. 2016-555487, 6 pp.

(Continued)

*Primary Examiner* — Kevin D Mew
(74) *Attorney, Agent, or Firm* — Staas & Halsey LLP

(57) ABSTRACT

The present invention provides a method includes: determining, by a base station, MBSFN subframe configuration signaling according to a configuration of a cell, where the MBSFN subframe configuration signaling includes CRS transmission configuration information used to indicate a region for transmitting a CRS in a time domain; sending, the MBSFN subframe configuration signaling to the user equipment; and transmitting a signal. Another method includes: determining configuration signaling according to a configuration of a cell, where the configuration signaling includes configuration information of the cell, transmitted by using a SIB 2 and used to indicate, to user equipment, configuration information of a subframe using an extended CP, or second configuration information of a CP length, used to indicate configuration information of a frequency band using an (Continued)

extended CP and/or a frequency band using a normal CP in at least one subframe; sending the configuration signaling to the user equipment.

28 Claims, 7 Drawing Sheets

(51) Int. Cl.
*H04L 27/26* (2006.01)
*H04L 12/18* (2006.01)
(52) U.S. Cl.
CPC ........ *H04L 27/2607* (2013.01); *H04L 5/0044* (2013.01)

(56) References Cited

U.S. PATENT DOCUMENTS

| | | | |
|---|---|---|---|
| 2012/0027110 A1* | 2/2012 | Han | H04J 11/0079 375/260 |
| 2012/0093122 A1 | 4/2012 | Dai et al. | |
| 2013/0070635 A1 | 3/2013 | Suo et al. | |
| 2013/0188531 A1* | 7/2013 | Zhang | H04L 5/0007 370/280 |
| 2013/0215823 A1* | 8/2013 | Shin | H04L 5/001 370/328 |
| 2013/0235818 A1* | 9/2013 | Yuan | H04L 25/0202 370/329 |
| 2013/0258935 A1 | 10/2013 | Zhang et al. | |
| 2013/0322277 A1* | 12/2013 | Vanganuru | H04W 24/08 370/252 |
| 2014/0092826 A1* | 4/2014 | Eriksson | H04L 5/0048 370/329 |
| 2014/0211695 A1* | 7/2014 | Cui | H04L 1/0026 370/328 |
| 2014/0211701 A1* | 7/2014 | Damnjanovic | H04L 5/005 370/329 |
| 2014/0369293 A1* | 12/2014 | Guo | H04L 5/0073 370/329 |
| 2015/0009925 A1* | 1/2015 | Park | H04L 5/005 370/329 |
| 2015/0071208 A1* | 3/2015 | Seo | H04L 5/0048 370/329 |
| 2015/0124691 A1* | 5/2015 | Li | H04L 5/005 370/312 |
| 2015/0207601 A1* | 7/2015 | Kim | H04L 5/0048 370/329 |
| 2015/0208208 A1* | 7/2015 | You | H04L 5/0094 370/312 |
| 2015/0229451 A1* | 8/2015 | Park | H04L 5/001 370/312 |
| 2015/0289234 A1* | 10/2015 | Zhao | H04L 1/1861 370/329 |
| 2015/0318973 A1* | 11/2015 | Wang | H04L 5/0023 370/329 |
| 2016/0113020 A1* | 4/2016 | Zhang | H04W 72/0406 370/329 |
| 2016/0142188 A1* | 5/2016 | Suzuki | H04W 24/10 370/329 |
| 2016/0174014 A1* | 6/2016 | You | H04B 7/2656 370/312 |

FOREIGN PATENT DOCUMENTS

| | | |
|---|---|---|
| CN | 101931599 A | 12/2010 |
| CN | 101998281 A | 3/2011 |
| CN | 102340852 A | 2/2012 |
| CN | 103347298 A | 10/2013 |
| EP | 2 925 070 A1 | 9/2015 |
| WO | WO 2010/105229 A1 | 9/2010 |
| WO | WO 2011/044290 A1 | 4/2011 |
| WO | WO 20131125897 A1 | 8/2013 |

OTHER PUBLICATIONS

New Postcom, "Downlink control signaling for CoMP", 3GPP TSG RAN WG1 Meeting #70, Qingdao, China, Aug. 13-17, 2012, R1-123435, 5 pp.

Intel Corporation, "Synchronization on Unsynchronized New Carrier", 3GPP TSG RAN WG1 Meeting #68-Bis, Jeju Island, Republic of Korea, Mar. 26-30, 2012, R1-121533, 8 pp.

Partial Supplementary European Search Report dated Feb. 6, 2017 in corresponding European Patent Application No. 14884682.7.

International Search Report dated Dec. 11, 2014 in corresponding International Patent Application No. PCT/CN2014/072812.

Japanese Notice of Allowance dated Mar. 6, 2018, in corresponding Japanese Patent Application No. 2016-555487, 3 pgs.

International Search Report, dated Dec. 11, 2014, in corresponding International Application No. PCT/CN2014/072812.

* cited by examiner

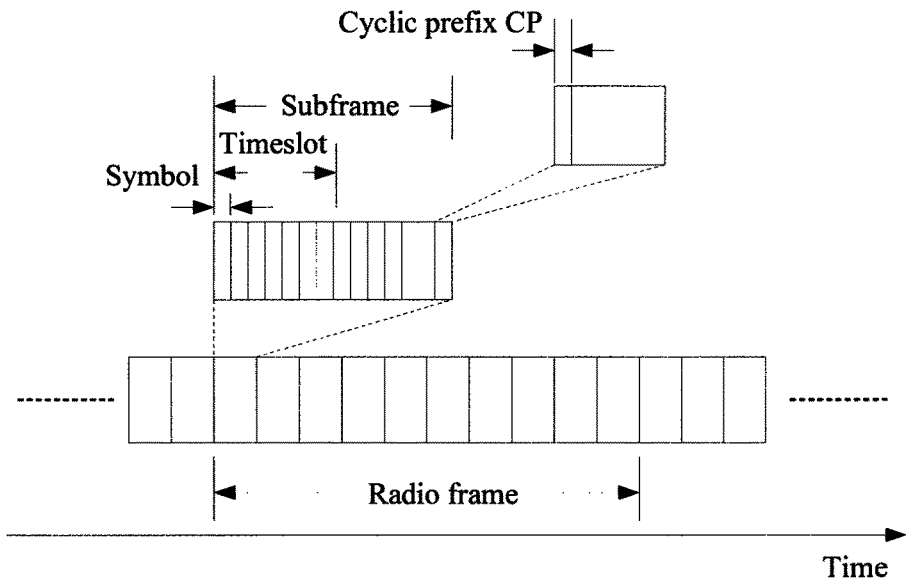

FIG. 1

A base station determines MBSFN subframe configuration signaling according to a configuration of a cell, where the MBSFN subframe configuration signaling includes CRS transmission configuration information, where the CRS transmission configuration information is used to indicate, to user equipment, a region for transmitting a CRS in a time domain ⏜ 21

The base station sends the MBSFN subframe configuration signaling to the user equipment ⏜ 22

The base station transmits a signal according to the CRS transmission configuration information ⏜ 23

FIG. 2

METHOD AND APPARATUS FOR SENDING INFORMATION, AND METHOD AND APPARATUS FOR RECEIVING INFORMATION

CROSS-REFERENCE TO RELATED APPLICATIONS

This application is a continuation of International Application No. PCT/CN2014/072812 filed on Mar. 3, 2014 which is incorporated herein by reference in its entirety.

TECHNICAL FIELD

The present invention relates to communications technologies, and in particular, to a method and an apparatus for sending information, and a method and an apparatus for receiving information.

BACKGROUND

In the prior art, to obtain a configuration of a serving cell, user equipment (User Equipment, UE for short) usually needs to detect transmission information sent by a base station. Generally, the UE determines the configuration of the serving cell by blindly detecting a reference signal that is sent by the base station and corresponding to a carrier type of the serving cell, or the UE may need to detect transmission information by means of blind detection, both causing a problem that efficiency of determining the configuration of the serving cell by the UE is low.

SUMMARY

The present invention provides a method and an apparatus for sending information, and a method and an apparatus for receiving information, which are used to improve efficiency of determining a configuration of a serving cell by UE and reduce complexity of determining the configuration of the cell by the UE.

According to a first aspect, the present invention provides a method for sending information, where the method includes:

determining, by a base station, multicast-broadcast single-frequency network MBSFN subframe configuration signaling according to a configuration of a cell, where the MBSFN subframe configuration signaling includes cell-specific reference signal CRS transmission configuration information, where the CRS transmission configuration information is used to indicate, to user equipment, a region for transmitting the CRS in a time domain;

sending, by the base station, the MBSFN subframe configuration signaling to the user equipment; and transmitting, by the base station, a signal according to the CRS transmission configuration information.

With reference to the first aspect, in a first possible implementation manner, the MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

With reference to the first aspect or the first possible implementation manner of the first aspect, in a second possible implementation manner, subframes of the cell include a first-type subframe and a second-type subframe, where the first-type subframe is configured and used to transmit the CRS, and the second-type subframe is configured and not used to transmit the CRS;

that the CRS transmission configuration information is used to indicate, to user equipment, a region for transmitting the CRS in a time domain includes: the CRS transmission configuration information is used to indicate, to the user equipment, that the CRS is transmitted in the first-type subframe of the cell, and indicate, to the user equipment, that the CRS is not transmitted in the second-type subframe of the cell; and the transmitting, by the base station, a signal according to the CRS transmission configuration information includes:

transmitting, by the base station, the CRS in the first-type subframe of the cell.

With reference to the first aspect or the first possible implementation manner of the first aspect, in a third possible implementation manner, that the CRS transmission configuration information is used to indicate, to user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and the transmitting, by the base station, a signal according to the CRS transmission configuration information includes:

transmitting, by the base station, the CRS in the non-MBSFN subframe of the cell and in the non-MBSFN region of the MBSFN subframe of the cell.

With reference to the first possible implementation manner of the first aspect, in a fourth possible implementation manner, that the CRS transmission configuration information is used to indicate, to user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and the transmitting, by the base station, a signal according to the CRS transmission configuration information includes: transmitting, by the base station, the CRS in the non-MBSFN subframe of the cell and in the non-MBSFN region of the MBSFN subframe of the cell; where when a radio frame of the cell includes at least seven MBSFN subframes, the CRS transmission configuration information indicated by the particular state in the states of the MBSFN subframe configuration signaling is indicated by a state of the MBSFN subframe configuration signaling in which a radio frame allocation period is one radio frame and a radio frame allocation offset is not zero.

In the foregoing technical solution, a base station uses MBSFN subframe configuration signaling to send CRS transmission configuration information to user equipment to indicate a region for transmitting a CRS in a time domain, and does not use additional signaling to notify the user equipment of the region for transmitting the CRS; without recognizing additional signaling, the user equipment can determine the region for transmitting the CRS, and further determine a configuration of a cell. Therefore, efficiency of determining the configuration of the cell by the user equipment is improved, complexity of determining the configuration of the cell by the UE is reduced, a signaling overhead is saved, and system compatibility is improved.

According to a second aspect, an embodiment of the present invention provides another method for sending information, where the method includes:

determining, by a base station, configuration signaling according to a configuration of a cell, where the configuration signaling includes configuration information of the cell, where the configuration information of the cell includes at least one of the following information: first configuration information of a cyclic prefix CP length or second configuration information of a CP length, where the first configuration information of the CP length is transmitted by using a system information block type 2 and used to indicate, to user equipment, configuration information of a subframe using an extended CP, and the second configuration information of the CP length is used to indicate, to the user equipment, configuration information of a frequency band using an extended CP and/or a frequency band using a normal CP in at least one subframe; sending, by the base station, the configuration signaling to the user equipment; and transmitting, by the base station, a signal according to the configuration information of the cell.

With reference to the second aspect, in a first possible implementation manner, the second configuration information of the CP length is further used to indicate, to the user equipment, a location of a guard band not for transmitting the signal in a particular subframe, where the guard band is an intermediate frequency band between a frequency band using an extended CP and a frequency band using a normal CP, and the particular subframe is a subframe using both an extended CP and a normal CP; and the transmitting, by the base station, a signal according to the configuration information of the cell includes: transmitting, by the base station, the signal according to the second configuration information of the CP length, and skipping transmitting the signal in the guard band in the particular subframe.

With reference to the first possible implementation manner of the second aspect, in a second possible implementation manner, the guard band is not disposed in a last symbol of each timeslot in the particular subframe; and the transmitting, by the base station, a signal according to the configuration information of the cell, further includes: transmitting, by the base station, the signal in the last symbol of each timeslot in the particular subframe.

With reference to the second possible implementation manner of the second aspect, in a third possible implementation manner, the second configuration information of the CP length is further used to indicate, to the user equipment, location information and/or bandwidth information of guard bands in different symbols in the particular subframe.

With reference to the second aspect, in a fourth possible implementation manner, the configuration information of the cell further includes cell-specific reference signal CRS transmission configuration information, where the CRS transmission configuration information is used to indicate, to the user equipment, a region for transmitting a CRS in a time domain.

With reference to the fourth possible implementation manner of the second aspect, in a fifth possible implementation manner, the configuration information of the cell further includes cell-specific reference signal CRS transmission configuration information, where the CRS transmission configuration information is used to indicate, to the user equipment, a region for transmitting a CRS in a time domain.

With reference to the fifth possible implementation manner of the second aspect, in a sixth possible implementation manner, the MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

With reference to the fifth or sixth possible implementation manner of the second aspect, in a seventh possible implementation manner, subframes of the cell include a first-type subframe and a second-type subframe, where the first-type subframe is configured and used to transmit the CRS, and the second-type subframe is configured and not used to transmit the CRS; that the CRS transmission configuration information is used to indicate, to the user equipment, a region for transmitting the CRS in a time domain includes: the CRS transmission configuration information is used to indicate, to the user equipment, that the CRS is transmitted in the first-type subframe of the cell, and indicate, to the user equipment, that the CRS is not transmitted in the second-type subframe of the cell; and the transmitting, by the base station, a signal according to the configuration information of the cell includes: transmitting, by the base station, the CRS in the first-type subframe of the cell.

With reference to the fifth or sixth possible implementation manner of the second aspect, in an eighth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and the transmitting, by the base station, a signal according to the configuration information of the cell includes: transmitting, by the base station, the CRS in the non-MBSFN subframe of the cell and in the non-MBSFN region of the MBSFN subframe of the cell.

With reference to the sixth possible implementation manner of the second aspect, in a ninth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and the transmitting, by the base station, a signal according to the CRS transmission configuration information includes: transmitting, by the base station, the CRS in the non-MBSFN subframe of the cell and in the non-MBSFN region of the MBSFN subframe of the cell; where when a radio frame of the cell includes at least seven MBSFN subframes, the CRS transmission configuration information indicated by the particular state in the states of the MBSFN subframe configuration signaling is indicated by a state of the MBSFN subframe configuration signaling in which a radio frame allocation period is one radio frame and a radio frame allocation offset is not zero.

In the foregoing technical solution, when a base station incorporates, in configuration information of a cell in configuration signaling, first configuration information of a CP length, for indicating, to user equipment, configuration information of a subframe using an extended CP, the user equipment can determine, without blindly detecting the MBSFN subframe, whether a symbol in the MBSFN subframe uses an extended CP or a normal CP, and therefore can directly detect a corresponding CSI-RS and CSI-IMR according to the configured CP length. Therefore, efficiency of determining a configuration of the cell by the UE is improved, complexity of determining the configuration of the cell by the UE is reduced, and efficiency of detecting the CSI-RS and CSI-IMR is improved. When the base station incorporates, in the configuration information of the cell in the configuration signaling, second configuration information of a CP length, for indicating, to the user equipment, configuration information of a frequency band using an extended CP and/or a frequency band using a normal CP in at least one subframe, frequency division multiplexing may be performed on an MBMS service and a non-MBMS service in a subframe, and a system capacity does not need to be limited by the extended CP. Therefore, resource utilization of a service using a normal CP is improved, flexibility of using radio resources is improved, a capacity of a subframe using an extended CP is increased, and resource utilization of a service using a normal CP is improved. Because the second configuration information of the CP length indicates, to the user equipment, the configuration information of the frequency band using the extended CP and/or the frequency band using the normal CP, efficiency of determining the configuration of the cell by the UE is improved, and complexity of implementation of the UE is reduced.

According to a third aspect, an embodiment of the present invention provides another method for receiving information, where the method includes:

receiving, by user equipment, multicast-broadcast single-frequency network MBSFN subframe configuration signaling sent by a base station, where the MBSFN subframe configuration signaling includes cell-specific reference signal CRS transmission configuration information, where the CRS transmission configuration information is used to indicate, to the user equipment, a region for transmitting a CRS in a time domain; and receiving, by the user equipment, a signal according to the CRS transmission configuration information.

With reference to the third aspect, in a first possible implementation manner, the MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

With reference to the third aspect or the first possible implementation manner of the third aspect, in a second possible implementation manner, subframes of the cell include a first-type subframe and a second-type subframe, where the first-type subframe is configured and used to transmit the CRS, and the second-type subframe is configured and not used to transmit the CRS; that the CRS transmission configuration information is used to indicate, to the user equipment, a region for transmitting the CRS in a time domain includes: the CRS transmission configuration information is used to indicate, to the user equipment, that the CRS is transmitted in the first-type subframe of the cell, and indicate, to the user equipment, that the CRS is not transmitted in the second-type subframe of the cell; and the receiving, by the user equipment, a signal according to the CRS transmission configuration information includes:

receiving, by the user equipment, the CRS in the first-type subframe of the cell.

With reference to the third aspect or the first possible implementation manner of the third aspect, in a third possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and the receiving, by the user equipment, a signal according to the CRS transmission configuration information includes: receiving, by the user equipment, the CRS in the non-MBSFN subframe of the cell and in the non-MBSFN region of the MBSFN subframe of the cell.

With reference to the first possible implementation manner of the third aspect, in a fourth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and the transmitting, by the base station, a signal according to the CRS transmission configuration information includes: transmitting, by the base station, the CRS in the non-MBSFN subframe of the cell and in the non-MBSFN region of the MBSFN subframe of the cell; where when a radio frame of the cell includes at least seven MBSFN subframes, the CRS transmission configuration information indicated by the particular state in the states of the MBSFN subframe configuration signaling is indicated by a state value of the MBSFN subframe configuration signaling in which a radio frame allocation period is one radio frame and a radio frame allocation offset is not zero.

In the foregoing technical solution, a base station uses MBSFN subframe configuration signaling to send CRS transmission configuration information to user equipment to indicate a region for transmitting a CRS in a time domain, and does not use additional signaling to notify the user equipment of the region for transmitting the CRS; without recognizing additional signaling, the user equipment can determine the region for transmitting the CRS, and further determine a configuration of a cell. Therefore, efficiency of determining the configuration of the cell by the user equipment is improved, complexity of determining the configuration of the cell by the UE is reduced, a signaling overhead is saved, and system compatibility is improved.

According to a fourth aspect, an embodiment of the present invention provides another method for receiving information, where the method includes:

receiving, by user equipment, configuration signaling sent by a base station, where the configuration signaling includes configuration information of a cell, where the configuration information of the cell includes at least one of the following information: first configuration information of a cyclic prefix CP length or second configuration information of a CP length, where the first configuration information of the CP length is transmitted by using a system information block type 2 and used to indicate, to the user equipment, configuration information of a subframe using an extended CP, and the second configuration information of the CP length is used to indicate, to the user equipment, configuration information of a frequency band using an extended CP and/or a frequency band using a normal CP in at least one subframe; and receiving, by the user equipment, a signal according to the configuration information of the cell.

With reference to the fourth aspect, in a first possible implementation manner, the second configuration information of the CP length is further used to indicate, to the user equipment, a location of a guard band not for transmitting the signal in a particular subframe, where the guard band is an intermediate frequency band between a frequency band using an extended CP and a frequency band using a normal CP, and the particular subframe is a subframe using both an extended CP and a normal CP; and the receiving, by the user equipment, a signal according to the configuration information of the cell includes: receiving, by the user equipment, the signal according to the second configuration information of the CP length, and skipping receiving the signal in the guard band in the particular subframe.

With reference to the first possible implementation manner of the fourth aspect, in a second possible implementation manner, the guard band is not disposed in a last symbol of each timeslot in the particular subframe; and the receiving, by the user equipment, a signal according to the configuration information of the cell, further includes: receiving, by the user equipment, the signal in the last symbol of each timeslot in the particular subframe.

With reference to the second possible implementation manner of the fourth aspect, in a third possible implementation manner, the second configuration information of the CP length is further used to indicate, to the user equipment, location information and/or bandwidth information of guard bands in different symbols in the particular subframe.

With reference to the fourth aspect, in a fourth possible implementation manner, the configuration signaling is MBSFN subframe configuration signaling.

With reference to the fourth possible implementation manner of the fourth aspect, in a fifth possible implementation manner, the configuration information of the cell further includes cell-specific reference signal CRS transmission configuration information, where the CRS transmission configuration information is used to indicate, to the user equipment, a region for transmitting a CRS in a time domain.

With reference to the fifth possible implementation manner of the fourth aspect, in a sixth possible implementation manner, the MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

With reference to the fifth or sixth possible implementation manner of the fourth aspect, in a seventh possible implementation manner, subframes of the cell include a first-type subframe and a second-type subframe, where the first-type subframe is configured and used to transmit the CRS, and the second-type subframe is configured and not used to transmit the CRS; that the CRS transmission configuration information is used to indicate, to the user equipment, a region for transmitting the CRS in a time domain includes: the CRS transmission configuration information is used to indicate, to the user equipment, that the CRS is transmitted in the first-type subframe of the cell, and indicate, to the user equipment, that the CRS is not transmitted in the second-type subframe of the cell; and the receiving, by the user equipment, a signal according to the configuration information of the cell includes: receiving, by the user equipment, the CRS in the first-type subframe of the cell.

With reference to the fifth or sixth possible implementation manner of the fourth aspect, in an eighth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and the receiving, by the user equipment, a signal according to the configuration information of the cell includes: receiving, by the user equipment, the CRS in the non-MBSFN subframe of the cell and in the non-MBSFN region of the MBSFN subframe of the cell.

With reference to the sixth possible implementation manner of the fourth aspect, in a ninth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and the receiving, by the user equipment, a signal according to the configuration information of the cell includes: receiving, by the user equipment, the CRS in the non-MBSFN subframe of the cell and in the non-MBSFN region of the MBSFN subframe of the cell; where when a radio frame of the cell includes at least seven MBSFN subframes, the CRS transmission configuration information indicated by the particular state in the states of the MBSFN subframe configuration signaling is indicated by a state value of the MBSFN subframe configuration signaling in which a radio frame allocation period is one radio frame and a radio frame allocation offset is not zero.

According to a fifth aspect, an embodiment of the present invention provides a base station, including:

a processor, configured to determine multicast-broadcast single-frequency network MBSFN subframe configuration signaling according to a configuration of a cell, where the MBSFN subframe configuration signaling includes cell-specific reference signal CRS transmission configuration information, where the CRS transmission configuration information is used to indicate, to user equipment, a region for transmitting the CRS in a time domain; and a transceiver, configured to send the MBSFN subframe configuration signaling to the user equipment; where the transceiver is further configured to transmit a signal according to the CRS transmission configuration information.

With reference to the fifth aspect, in a first possible implementation manner, the MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

With reference to the fifth aspect or the first possible implementation manner of the fifth aspect, in a second possible implementation manner, subframes of the cell include a first-type subframe and a second-type subframe, where the first-type subframe is configured and used to transmit the CRS, and the second-type subframe is configured and not used to transmit the CRS; that the CRS transmission configuration information is used to indicate, to user equipment, a region for transmitting the CRS in a time domain includes: the CRS transmission configuration information is used to indicate, to the user equipment, that the CRS is transmitted in the first-type subframe of the cell, and indicate, to the user equipment, that the CRS is not transmitted in the second-type subframe of the cell; and that the transceiver is further configured to transmit a signal according to the CRS transmission configuration information includes: the transceiver is further configured to transmit the CRS in the first-type subframe of the cell.

With reference to the fifth aspect or the first possible implementation manner of the fifth aspect, in a third possible implementation manner, that the CRS transmission configuration information is used to indicate, to user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver is further configured to transmit a signal according to the CRS transmission configuration information includes: the transceiver is further configured to transmit the CRS in the non-MBSFN subframe of the cell and in the non-MBSFN region of the MBSFN subframe of the cell.

With reference to the first possible implementation manner of the fifth aspect, in a fourth possible implementation manner, that the CRS transmission configuration information is used to indicate, to user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver is further configured to transmit a signal according to the CRS transmission configuration information includes: the transceiver is further configured to transmit the CRS in the non-MBSFN subframe of the cell and in the non-MBSFN region of the MBSFN subframe of the cell; where when a radio frame of the cell includes at least seven MBSFN subframes, the CRS transmission configuration information indicated by the particular state in the states of the MBSFN subframe configuration signaling is indicated by a state of the MBSFN subframe configuration signaling in which a radio frame allocation period is one radio frame and a radio frame allocation offset is not zero.

According to a sixth aspect, an embodiment of the present invention provides a base station, including:

a processor, configured to determine configuration signaling according to a configuration of a cell, where the configuration signaling includes configuration information of the cell, where the configuration information of the cell includes at least one of the following information: first configuration information of a cyclic prefix CP length or second configuration information of a CP length, where the first configuration information of the CP length is transmitted by using a system information block type 2 and used to indicate, to user equipment, configuration information of a subframe using an extended CP, and the second configuration information of the CP length is used to indicate, to the user equipment, configuration information of a frequency band using an extended CP and/or a frequency band using a normal CP in at least one subframe; and a transceiver, configured to send the configuration signaling to the user equipment; where the transceiver is further configured to transmit a signal according to the configuration information of the cell.

With reference to the sixth aspect, in a first possible implementation manner, the second configuration information of the CP length is further used to indicate, to the user equipment, a location of a guard band not for transmitting the signal in a particular subframe, where the guard band is an intermediate frequency band between a frequency band using an extended CP and a frequency band using a normal CP, and the particular subframe is a subframe using both an extended CP and a normal CP; and that the transceiver is further configured to transmit a signal according to the configuration information of the cell includes: the transceiver is further configured to transmit the signal according to the second configuration information of the CP length, and skip transmitting the signal in the guard band in the particular subframe.

With reference to the first possible implementation manner of the sixth aspect, in a second possible implementation manner, the guard band is not disposed in a last symbol of each timeslot in the particular subframe; and that the transceiver is further configured to transmit a signal according to the configuration information of the cell includes: the transceiver is further configured to transmit the signal in the last symbol of each timeslot in the particular subframe.

With reference to the second possible implementation manner of the sixth aspect, in a third possible implementation manner, the second configuration information of the CP length is further used to indicate, to the user equipment, location information and/or bandwidth information of guard bands in different symbols in the particular subframe.

With reference to the sixth aspect, in a fourth possible implementation manner, the configuration signaling is multicast-broadcast single-frequency network MBSFN subframe configuration signaling.

With reference to the fourth possible implementation manner of the sixth aspect, in a fifth possible implementation manner, the configuration information of the cell further includes cell-specific reference signal CRS transmission configuration information, where the CRS transmission configuration information is used to indicate, to the user equipment, a region for transmitting a CRS in a time domain.

With reference to the fifth possible implementation manner of the sixth aspect, in a sixth possible implementation manner, the MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

With reference to the fifth or sixth possible implementation manner of the sixth aspect, in a seventh possible implementation manner, subframes of the cell include a first-type subframe and a second-type subframe, where the first-type subframe is configured and used to transmit the CRS, and the second-type subframe is configured and not used to transmit the CRS; that the CRS transmission configuration information is used to indicate, to the user equipment, a region for transmitting the CRS in a time domain includes: the CRS transmission configuration information is used to indicate, to the user equipment, that the CRS is transmitted in the first-type subframe of the cell, and indicate, to the user equipment, that the CRS is not transmitted in the second-type subframe of the cell; and that the transceiver is further configured to transmit a signal according to the configuration information of the cell includes: the transceiver is further configured to transmit the CRS in the first-type subframe of the cell.

With reference to the fifth or sixth possible implementation manner of the sixth aspect, in an eighth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver is further configured to transmit a signal according to the configuration information of the cell includes: the transceiver is further configured to transmit the CRS in the non-MBSFN subframe of the cell and in the non-MBSFN region of the MBSFN subframe of the cell.

With reference to the sixth possible implementation manner of the sixth aspect, in a ninth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver is further configured to transmit a signal according to the configuration information of the cell includes: the transceiver is further configured to transmit the CRS in the non-MBSFN subframe of the cell and in the non-MBSFN region of the MBSFN subframe of the cell; where when a radio frame of the cell includes at least seven MBSFN subframes, the CRS transmission configuration information indicated by the particular state in the states of the MBSFN subframe configuration signaling is indicated by a state of the MBSFN subframe configuration signaling in which a radio frame allocation period is one radio frame and a radio frame allocation offset is not zero.

According to a seventh aspect, an embodiment of the present invention provides user equipment, including:

a transceiver, configured to receive multicast-broadcast single-frequency network MBSFN subframe configuration signaling sent by a base station, where the MBSFN subframe configuration signaling includes cell-specific reference signal CRS transmission configuration information, where the CRS transmission configuration information is used to indicate, to the user equipment, a region for transmitting a CRS in a time domain; and the processor, configured to parse the MBSFN subframe configuration signaling; where the transceiver is further configured to receive a signal according to the CRS transmission configuration information.

With reference to the seventh aspect, in a first possible implementation manner, the MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

With reference to the seventh aspect or the first possible implementation manner of the seventh aspect, in a second possible implementation manner, subframes of the cell include a first-type subframe and a second-type subframe, where the first-type subframe is configured and used to transmit the CRS, and the second-type subframe is configured and not used to transmit the CRS;

that the CRS transmission configuration information is used to indicate, to the user equipment, a region for transmitting the CRS in a time domain includes: the CRS transmission configuration information is used to indicate, to the user equipment, that the CRS is transmitted in the first-type subframe of the cell, and indicate, to the user equipment, that the CRS is not transmitted in the second-type subframe of the cell; and that the transceiver is further configured to receive a signal according to the CRS transmission configuration information includes: the transceiver is further configured to receive the CRS in the first-type subframe of the cell.

With reference to the seventh aspect or the first possible implementation manner of the seventh aspect, in a third possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver is further configured to receive a signal according to the CRS transmission configuration information includes: the transceiver is further configured to receive the CRS in the non-MBSFN subframe of the cell and in the non-MBSFN region of the MBSFN subframe of the cell.

With reference to the first possible implementation manner of the seventh aspect, in a fourth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and the transmitting, by the base station, a signal according to the CRS transmission configuration information includes: transmitting, by the base station, the CRS in the non-MBSFN subframe of the cell and in the non-MBSFN region of the MBSFN subframe of the cell; where when a radio frame of the cell includes at least seven MBSFN subframes, the CRS transmission configuration information indicated by the particular state in the states of the MBSFN subframe configuration signaling is indicated by a state value of the MBSFN subframe configuration signaling in which a radio frame allocation period is one radio frame and a radio frame allocation offset is not zero.

According to an eighth aspect, an embodiment of the present invention further provides user equipment, including:

a transceiver, configured to receive configuration signaling sent by a base station, where the configuration signaling includes configuration information of a cell, where the configuration information of the cell includes at least one of the following information: first configuration information of a cyclic prefix CP length or second configuration information of a CP length, where the first configuration information of the CP length is transmitted by using a system information block type 2 and used to indicate, to the user equipment, configuration information of a subframe using an extended CP, and the second configuration information of the CP length is used to indicate, to the user equipment, configuration information of a frequency band using an extended CP and/or a frequency band using a normal CP in at least one subframe; and a processor, configured to parse the configuration signaling; where the transceiver is further configured to receive a signal according to the configuration information of the cell.

With reference to the eighth aspect, in a first possible implementation manner, the second configuration information of the CP length is further used to indicate, to the user equipment, a location of a guard band not for transmitting the signal in a particular subframe, where the guard band is an intermediate frequency band between a frequency band using an extended CP and a frequency band using a normal CP, and the particular subframe is a subframe using both an extended CP and a normal CP; and that the transceiver is further configured to receive a signal according to the configuration information of the cell includes: the transceiver is further configured to receive the signal according to the second configuration information of the CP length, and skip receiving the signal in the guard band in the particular subframe.

With reference to the first possible implementation manner of the eighth aspect, in a second possible implementation manner, the guard band is not disposed in a last symbol of each timeslot in the particular subframe; and that the transceiver is further configured to receive a signal according to the configuration information of the cell further includes: the transceiver is further configured to receive the signal in the last symbol of each timeslot in the particular subframe.

With reference to the second possible implementation manner of the eighth aspect, in a third possible implementation manner, the second configuration information of the CP length is further used to indicate, to the user equipment, location information and/or bandwidth information of guard bands in different symbols in the particular subframe.

With reference to the eighth aspect, in a fourth possible implementation manner, the configuration signaling is MBSFN subframe configuration signaling.

With reference to the fourth possible implementation manner of the eighth aspect, in a fifth possible implementation manner, the configuration information of the cell further includes cell-specific reference signal CRS transmission configuration information, where the CRS transmission configuration information is used to indicate, to the user equipment, a region for transmitting a CRS in a time domain.

With reference to the fifth possible implementation manner of the eighth aspect, in a sixth possible implementation manner, the MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

With reference to the fifth or sixth possible implementation manner of the eighth aspect, in a seventh possible implementation manner, subframes of the cell include a first-type subframe and a second-type subframe, where the first-type subframe is configured and used to transmit the CRS, and the second-type subframe is configured and not used to transmit the CRS; that the CRS transmission configuration information is used to indicate, to the user equipment, a region for transmitting the CRS in a time domain includes: the CRS transmission configuration information is used to indicate, to the user equipment, that the CRS is transmitted in the first-type subframe of the cell, and indicate, to the user equipment, that the CRS is not transmitted in the second-type subframe of the cell; and that the transceiver is further configured to receive a signal according to the configuration information of the cell includes: the transceiver is further configured to receive the CRS in the first-type subframe of the cell.

With reference to the fifth or sixth possible implementation manner of the eighth aspect, in an eighth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver is further configured to receive a signal according to the configuration information of the cell includes: the transceiver is further configured to receive the CRS in the non-MBSFN subframe of the cell and in the non-MBSFN region of the MBSFN subframe of the cell.

With reference to the sixth possible implementation manner of the eighth aspect, in a ninth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver is further configured to receive a signal according to the configuration information of the cell includes: the transceiver is further configured to receive the CRS in the non-MBSFN subframe of the cell and in the non-MBSFN region of the MBSFN subframe of the cell; where when a radio frame of the cell includes at least seven MBSFN subframes, the CRS transmission configuration information indicated by the particular state in the states of the MBSFN subframe configuration signaling is indicated by a state value of the MBSFN subframe configuration signaling in which a radio frame allocation period is one radio frame and a radio frame allocation offset is not zero.

According to a ninth aspect, an embodiment of the present invention further provides an apparatus for sending information, where the apparatus includes:

a determining module, configured to determine multicast-broadcast single-frequency network MBSFN subframe configuration signaling according to a configuration of a cell, where the MBSFN subframe configuration signaling includes cell-specific reference signal CRS transmission configuration information, where the CRS transmission configuration information is used to indicate, to user equipment, a region for transmitting the CRS in a time domain; and a transceiver module, configured to send the MBSFN subframe configuration signaling to the user equipment; where the transceiver module is further configured to transmit a signal according to the CRS transmission configuration information.

With reference to the ninth aspect, in a first possible implementation manner, the MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

With reference to the ninth aspect or the first possible implementation manner of the ninth aspect, in a second possible implementation manner, subframes of the cell include a first-type subframe and a second-type subframe, where the first-type subframe is configured and used to transmit the CRS, and the second-type subframe is configured and not used to transmit the CRS; that the CRS transmission configuration information is used to indicate, to user equipment, a region for transmitting the CRS in a time domain includes: the CRS transmission configuration information is used to indicate, to the user equipment, that the CRS is transmitted in the first-type subframe of the cell, and indicate, to the user equipment, that the CRS is not transmitted in the second-type subframe of the cell; and that the transceiver module is further configured to transmit a signal according to the CRS transmission configuration information includes: the transceiver module is further configured to transmit the CRS in the first-type subframe of the cell.

With reference to the ninth aspect or the first possible implementation manner of the ninth aspect, in a third possible implementation manner, that the CRS transmission configuration information is used to indicate, to user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver module is further configured to transmit a signal according to the CRS transmission configuration information includes:

the transceiver module is further configured to transmit the CRS in the non-MBSFN subframe of the cell and in the non-MBSFN region of the MBSFN subframe of the cell.

With reference to the first possible implementation manner of the ninth aspect, in a fourth possible implementation manner, that the CRS transmission configuration information is used to indicate, to user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver module is further configured to transmit a signal according to the CRS transmission configuration information includes: the transceiver module is further configured to transmit the CRS in the non-MBSFN subframe of the cell and in the non-MBSFN region of the MBSFN subframe of the cell; where when a radio frame of the cell includes at least seven MBSFN subframes, the CRS transmission configuration information indicated by the particular state in the states of the MBSFN subframe configuration signaling is indicated by a state value of the MBSFN subframe configuration signaling in which a radio frame allocation period is one radio frame and a radio frame allocation offset is not zero.

According to a tenth aspect, an embodiment of the present invention further provides an apparatus for sending information, where the apparatus includes:

a determining module, configured to determine configuration signaling according to a configuration of a cell, where the configuration signaling includes configuration information of the cell, where the configuration information of the cell includes at least one of the following information: first configuration information of a cyclic prefix CP length or second configuration information of a CP length, where the first configuration information of the CP length is transmitted by using a system information block type 2 and used to indicate, to user equipment, configuration information of a subframe using an extended CP, and the second configuration information of the CP length is used to indicate, to the user equipment, configuration information of a frequency band using an extended CP and/or a frequency band using a normal CP in at least one subframe; and a transceiver module, configured to send the configuration signaling to the user equipment; where the transceiver module is further configured to transmit a signal according to the configuration information of the cell.

With reference to the tenth aspect, in a first possible implementation manner, the second configuration information of the CP length is further used to indicate, to the user equipment, a location of a guard band not for transmitting the signal in a particular subframe, where the guard band is an intermediate frequency band between a frequency band using an extended CP and a frequency band using a normal CP, and the particular subframe is a subframe using both an extended CP and a normal CP; and that the transceiver module is further configured to transmit a signal according to the configuration information of the cell includes: the transceiver module is further configured to transmit the signal according to the second configuration information of the CP length, and skip transmitting the signal in the guard band in the particular subframe.

With reference to the first possible implementation manner of the tenth aspect, in a second possible implementation manner, the guard band is not disposed in a last symbol of each timeslot in the particular subframe; and that the transceiver module is further configured to transmit a signal according to the configuration information of the cell includes: the transceiver module is further configured to transmit the signal in the last symbol of each timeslot in the particular subframe.

With reference to the second possible implementation manner of the tenth aspect, in a third possible implementation manner, the second configuration information of the CP length is further used to indicate, to the user equipment, location information and/or bandwidth information of guard bands in different symbols in the particular subframe.

With reference to the tenth aspect, in a fourth possible implementation manner, the configuration signaling is multicast-broadcast single-frequency network MBSFN subframe configuration signaling.

With reference to the fourth possible implementation manner of the tenth aspect, in a fifth possible implementation manner, the configuration information of the cell further includes cell-specific reference signal CRS transmission configuration information, where the CRS transmission configuration information is used to indicate, to the user equipment, a region for transmitting a CRS in a time domain.

With reference to the fifth possible implementation manner of the tenth aspect, in a sixth possible implementation manner, the MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

With reference to the fifth or sixth possible implementation manner of the tenth aspect, in a seventh possible implementation manner, subframes of the cell include a first-type subframe and a second-type subframe, where the first-type subframe is configured and used to transmit the CRS, and the second-type subframe is configured and not used to transmit the CRS; that the CRS transmission configuration information is used to indicate, to the user equipment, a region for transmitting the CRS in a time domain includes: the CRS transmission configuration information is used to indicate, to the user equipment, that the CRS is transmitted in the first-type subframe of the cell, and indicate, to the user equipment, that the CRS is not transmitted in the second-type subframe of the cell; and that the transceiver module is further configured to transmit a signal according to the configuration information of the cell includes:

the transceiver module is further configured to transmit the CRS in the first-type subframe of the cell.

With reference to the fifth or sixth possible implementation manner of the tenth aspect, in an eighth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver module is further configured to transmit a signal according to the configuration information of the cell includes: the transceiver module is further configured to transmit the CRS in the non-MBSFN subframe of the cell and in the non-MBSFN region of the MBSFN subframe of the cell.

With reference to the sixth possible implementation manner of the tenth aspect, in a ninth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver module is further configured to transmit a signal according to the configuration information of the cell includes: the transceiver module is further configured to transmit the CRS in the non-MBSFN subframe of the cell and in the non-MBSFN region of the MBSFN subframe of the cell; where when a radio frame of the cell includes at least seven MBSFN subframes, the CRS transmission configuration information indicated by the particular state in the states of the MBSFN subframe configuration signaling is indicated by a state of the MBSFN subframe configuration signaling in which a radio frame allocation period is one radio frame and a radio frame allocation offset is not zero.

According to an eleventh aspect, an embodiment of the present invention provides an apparatus for receiving information, where the apparatus includes:

a transceiver module, configured to receive multicast-broadcast single-frequency network MBSFN subframe configuration signaling sent by a base station, where the MBSFN subframe configuration signaling includes cell-specific reference signal CRS transmission configuration information, where the CRS transmission configuration information is used to indicate, to the apparatus, a region for transmitting a CRS in a time domain; where the transceiver module is further configured to receive a signal according to the CRS transmission configuration information.

With reference to the eleventh aspect, in a first possible implementation manner, the MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

With reference to the eleventh aspect or the first possible implementation manner of the eleventh aspect, in a second possible implementation manner, subframes of the cell include a first-type subframe and a second-type subframe, where the first-type subframe is configured and used to transmit the CRS, and the second-type subframe is configured and not used to transmit the CRS;

that the CRS transmission configuration information is used to indicate, to the user equipment, a region for transmitting the CRS in a time domain includes: the CRS transmission configuration information is used to indicate, to the user equipment, that the CRS is transmitted in the first-type subframe of the cell, and indicate, to the user equipment, that the CRS is not transmitted in the second-type subframe of the cell; and that the transceiver module is further configured to receive a signal according to the CRS transmission configuration information includes: the transceiver module is further configured to receive the CRS in the first-type subframe of the cell.

With reference to the eleventh aspect or the first possible implementation manner of the eleventh aspect, in a third possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver module is further configured to receive a signal according to the CRS transmission configuration information includes: the transceiver module is further configured to receive the CRS in the non-MBSFN subframe of the cell and in the non-MBSFN region of the MBSFN subframe of the cell.

With reference to the first possible implementation manner of the eleventh aspect, in a fourth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver module is further configured to receive a signal according to the CRS transmission configuration information includes: the transceiver module is further configured to receive the CRS in the non-MBSFN subframe of the cell and in the non-MBSFN region of the MBSFN subframe of the cell; where when a radio frame of the cell includes at least seven MBSFN subframes, the CRS transmission configuration information indicated by the particular state in the states of the MBSFN subframe configuration signaling is indicated by a state value of the MBSFN subframe configuration signaling in which a radio frame allocation period is one radio frame and a radio frame allocation offset is not zero.

According to a twelfth aspect, an embodiment of the present invention provides an apparatus for receiving information, where the apparatus includes:

a transceiver module, configured to receive configuration signaling sent by a base station, where the configuration signaling includes configuration information of a cell, where the configuration information of the cell includes at least one of the following information: first configuration information of a cyclic prefix CP length or second configuration information of a CP length, where the first configuration information of the CP length is transmitted by using a system information block type 2 and used to indicate, to the apparatus, configuration information of a subframe using an extended CP, and the second configuration information of the CP length is used to indicate, to the apparatus, configuration information of a frequency band using an extended CP and/or a frequency band using a normal CP in at least one subframe; where the transceiver module is further configured to receive a signal according to the configuration information of the cell.

With reference to the twelfth aspect, in a first possible implementation manner, the second configuration information of the CP length is further used to indicate, to the apparatus, a location of a guard band not for transmitting the signal in a particular subframe, where the guard band is an intermediate frequency band between a frequency band using an extended CP and a frequency band using a normal CP, and the particular subframe is a subframe using both an extended CP and a normal CP; and that the transceiver module is further configured to receive a signal according to the configuration information of the cell includes: the transceiver module is further configured to receive the signal according to the second configuration information of the CP length, and skip receiving the signal in the guard band in the particular subframe.

With reference to the first possible implementation manner of the twelfth aspect, in a second possible implementation manner, the guard band is not disposed in a last symbol of each timeslot in the particular subframe; and that the transceiver module is further configured to receive a signal according to the configuration information of the cell includes: the transceiver module is further configured to receive the signal in the last symbol of each timeslot in the particular subframe.

With reference to the second possible implementation manner of the twelfth aspect, in a third possible implementation manner, the second configuration information of the CP length is further used to indicate, to the apparatus, location information and/or bandwidth information of guard bands in different symbols in the particular subframe.

With reference to the twelfth aspect, in a fourth possible implementation manner, the configuration information of the cell further includes cell-specific reference signal CRS transmission configuration information, where the CRS transmission configuration information is used to indicate, to the apparatus, a region for transmitting a CRS in a time domain.

With reference to the fourth possible implementation manner of the twelfth aspect, in a fifth possible implementation manner, the configuration information of the cell further includes cell-specific reference signal CRS transmission configuration information, where the CRS transmission configuration information is used to indicate, to the apparatus, a region for transmitting a CRS in a time domain.

With reference to the fifth possible implementation manner of the twelfth aspect, in a sixth possible implementation manner, the MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

With reference to the fifth or sixth possible implementation manner of the twelfth aspect, in a seventh possible implementation manner, subframes of the cell include a first-type subframe and a second-type subframe, where the first-type subframe is configured and used to transmit the CRS, and the second-type subframe is configured and not used to transmit the CRS; that the CRS transmission configuration information is used to indicate, to the user equipment, a region for transmitting the CRS in a time domain includes: the CRS transmission configuration information is used to indicate, to the user equipment, that the CRS is transmitted in the first-type subframe of the cell, and indicate, to the user equipment, that the CRS is not transmitted in the second-type subframe of the cell; and that the transceiver module is further configured to receive a signal according to the configuration information of the cell includes:

the transceiver module is further configured to receive the CRS in the first-type subframe of the cell.

With reference to the fifth or sixth possible implementation manner of the twelfth aspect, in an eighth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver module is further configured to receive a signal according to the configuration information of the cell includes: the transceiver module is further configured to receive the CRS in the non-MBSFN subframe of the cell and in the non-MBSFN region of the MBSFN subframe of the cell.

With reference to the sixth possible implementation manner of the twelfth aspect, in a ninth possible implementation manner, that the CRS transmission configuration information is used to indicate, to the user equipment, a region for transmitting the CRS in a time domain includes: the CRS transmission configuration information is used to indicate, to the user equipment, that the CRS is transmitted in a non-MBSFN subframe of the cell and in a non-MBSFN region of an MBSFN subframe of the cell; and that the transceiver module is further configured to receive a signal according to the configuration information of the cell includes: the transceiver module is further configured to receive the CRS in the non-MBSFN subframe of the cell and in the non-MBSFN region of the MBSFN subframe of the cell; where when a radio frame of the cell includes at least seven MBSFN subframes, the CRS transmission configuration information indicated by the particular state in the states of the MBSFN subframe configuration signaling is indicated by a state value of the MBSFN subframe configuration signaling in which a radio frame allocation period is one radio frame and a radio frame allocation offset is not zero.

In the foregoing technical solution, a base station uses MBSFN subframe configuration signaling to send CRS transmission configuration information to user equipment to indicate a region for transmitting a CRS in a time domain, and does not use additional signaling to notify the user equipment of the region for transmitting the CRS; without recognizing additional signaling, the user equipment can determine the region for transmitting the CRS, and further determine a configuration of a cell. Therefore, efficiency of determining the configuration of the cell by the user equipment is improved, complexity of determining the configuration of the cell by the UE is reduced, a signaling overhead is saved, and system compatibility is improved. Alternatively, when a base station incorporates, in configuration information of a cell in configuration signaling, first configuration information of a CP length, for indicating, to user equipment, configuration information of a subframe using an extended CP, the user equipment can determine, without blindly detecting the MBSFN subframe, whether a symbol in the MBSFN subframe uses an extended CP or a normal CP, and therefore can directly detect a corresponding CSI-RS and CSI-IMR according to the configured CP length. Therefore, efficiency of determining a configuration of the cell by the UE is improved, complexity of determining the configuration of the cell by the UE is reduced, and efficiency of detecting the CSI-RS and CSI-IMR is improved. When the base station incorporates, in the configuration information of the cell in the configuration signaling, second configuration information of a CP length, for indicating, to the user equipment, configuration information of a frequency band using an extended CP and/or a frequency band using a normal CP in at least one subframe, frequency division multiplexing may be performed on an MBMS service and a non-MBMS service in a subframe, and a system capacity does not need to be limited by the extended CP. Therefore, resource utilization of a service using a normal CP is improved, flexibility of using radio resources is improved, a capacity of a subframe using an extended CP is increased, and resource utilization of a service using a normal CP is improved. Because the second configuration information of the CP length indicates, to the user equipment, the configuration information of the frequency band using the extended CP and/or the frequency band using the normal CP, efficiency of determining the configuration of the cell by the UE is improved, and complexity of implementation of the UE is reduced.

BRIEF DESCRIPTION OF DRAWINGS

FIG. 1 is a schematic structural diagram of a radio frame according to an embodiment of the present invention;

FIG. 2 is a flowchart of a method for sending information according to an embodiment of the present invention;

DESCRIPTION OF EMBODIMENTS

Figure 3:
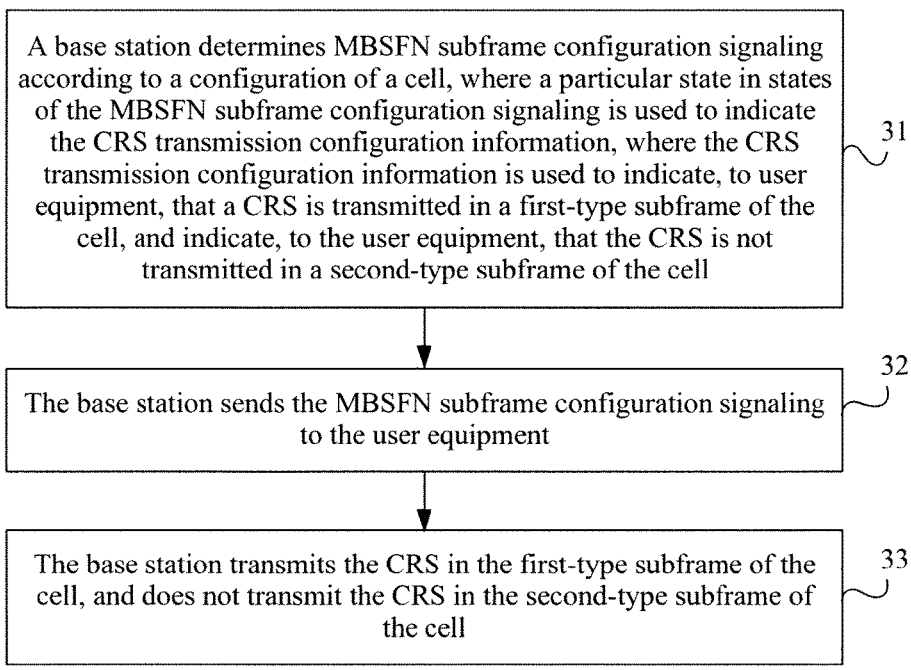
FIG. 3 is a flowchart of another method for sending information according to an embodiment of the present invention.

A radio frame is a unit of radio resources in a time domain. As shown in FIG. 1, a length of a radio frame may be 10 ms, and a radio frame may include 10 subframes. The 10 subframes, numbered from left to right in sequence, are subframe 0, subframe 1, subframe 2, subframe 3, subframe 4, subframe 5, subframe 6, subframe 7, subframe 8, and subframe 9. A length of a subframe may be 1 ms, and a subframe includes two timeslots (slot). Multiple symbols may be transmitted in a subframe. A length of each transmitted symbol may be determined according to a cyclic prefix (Cyclic Prefix, CP) length used by the symbol. A CP is a part of a symbol, and is a signal transmitted in a foremost position of the symbol, mainly to reduce impact caused by inter-symbol interference on quality of signal transmission. In addition, subframes may be classified into multicast-broadcast single-frequency network (Multimedia Broadcast multicast service Single Frequency Network, MBSFN for short) subframes and non-MBSFN subframes.

Figure 4:
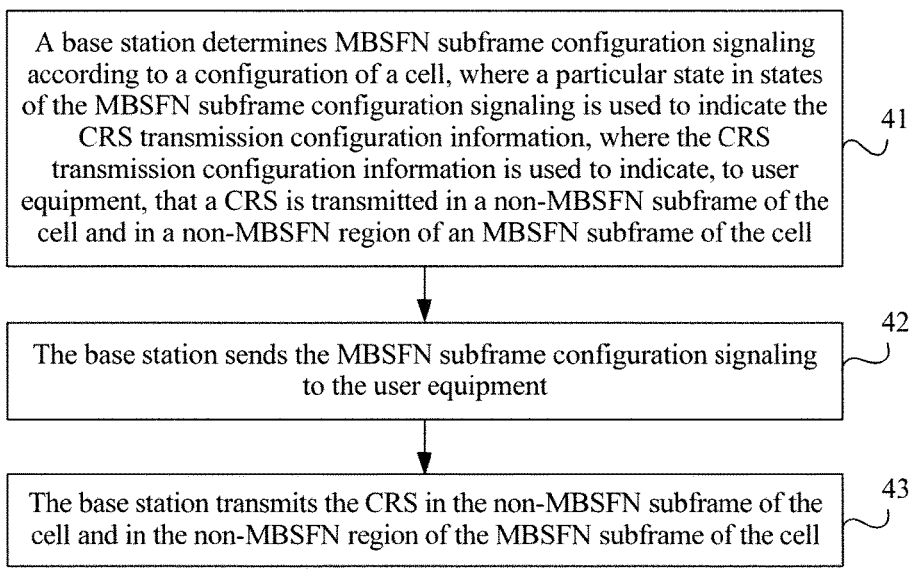
FIG. 4 is a flowchart of still another method for sending information according to an embodiment of the present invention.

Method embodiments corresponding to FIG. 2, FIG. 3, and FIG. 4 mainly describe, from a perspective of a base station side, how to improve efficiency of determining a configuration of a cell by UE, by indicating CRS transmission configuration information in a subframe to the user equipment.

FIG. 2 is a flowchart of a method for sending information according to an embodiment of the present invention. As shown in FIG. 2, the method provided by this embodiment includes:

Step 21: A base station determines MBSFN subframe configuration signaling according to a configuration of a cell, where the MBSFN subframe configuration signaling includes CRS transmission configuration information, where the CRS transmission configuration information is used to indicate, to user equipment, a region for transmitting a cell-specific reference signal (Cell-specific Reference Signal, CRS for short) in a time domain.

The CRS transmission configuration information is used to indicate, to the user equipment, the region for transmitting the CRS in the time domain. The region for transmitting the CRS in the time domain includes a subframe for transmitting the CRS and the region for transmitting the CRS in the subframe, where the region for transmitting the CRS may be a part of symbols in a subframe, for example, a non-MBSFN region of an MBSFN subframe.

The MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

In a piece of MBSFN subframe configuration signaling, a state of the MBSFN subframe configuration signaling is used to provide an indication for the UE.

For example, the n bits of the MBSFN subframe configuration signaling carry the following parameters: MBSFN subframe configuration (MBSFN subframe configuration), radio frame allocation period (radio frame allocation period), radio frame allocation offset (radio frame Allocation Offset), and subframe allocation (subframe Allocation). A subframe allocation manner is a one-radio-frame (one Frame) allocation manner or a four-radio-frame (four Frames) allocation manner. Particular states in the states of the MBSFN subframe configuration signaling are indicated by values of the foregoing parameters in the MBSFN subframe configuration signaling. Optionally, the states of the MBSFN subframe configuration signaling include but are not limited to a state in which a radio frame includes a maximum of six MBSFN subframes.

A type of the MBSFN subframe configuration is sequence (SEQUENCE). The radio frame allocation period is a parameter of an enumeration type, and its value is one of {n1, n2, n4, n8, n16, n32}, where n1/m2/n4/n8/n16/n32 represents that the radio frame period is 1/2/4/8/16/32 radio frames. A type of the radio frame allocation offset is integer (INTEGER), and a value range is INTEGER (0-7), namely, integers from 0 to 7, where 0//1/2/3/4/5/6/7 represents that the offset is 0//1/2/3/4/5/6/7 radio frames. A type of the subframe allocation is choice (CHOICE), and a value of the subframe allocation is either the one-radio-frame allocation manner or the four-radio-frame allocation manner. A type of the one-radio-frame allocation manner is bit string (BIT STRING), and a length thereof is SIZE(6), where bit 0/1/2/3/4/5 represents whether subframe 1/2/3/6/7/8 is an MBSFN subframe, where 1 represents an MBSFN subframe and 0 represents a non-MBSFN subframe. A type of the four-radio-frame allocation manner is BIT STRING, and a length thereof is SIZE(24), where bits 0-5, 6-11, 12-17, and 18-23 respectively represent MBSFN subframe configurations in radio frames 0, 1, 2, and 3 in the radio frame period.

Step 22: The base station sends the MBSFN subframe configuration signaling to the user equipment.

Step 23: The base station transmits a signal according to the CRS transmission configuration information. The signal transmitted by the base station may be a data signal or a control signal or a reference signal or the like, which is not limited herein.

In the prior art, a base station may use additional signaling to notify user equipment (User Equipment, UE for short) of whether a carrier type of a cell is a conventional carrier type or a new carrier type (New Carrier Type, NCT for short), and further determine a subframe and a symbol for transmitting a CRS. Moreover, only UE that recognizes the new carrier type can recognize the additional signaling. Therefore, efficiency of determining a configuration of the cell by the UE is reduced, a signaling overhead is increased, and system compatibility is reduced. In the conventional carrier type, the CRS is definitely transmitted in a non-MBSFN subframe, and the CRS is definitely transmitted in a control region of an MBSFN subframe, but in the MBSFN subframe, the CRS is not transmitted in any region except the control region. In the new carrier type (New Carrier Type, NCT for short), the CRS is replaced with a reduced CRS (Reduced CRS, RCRS for short). For example, the CRS is transmitted only in subframe 0 and subframe 5 of each radio frame, and a quantity of CRS ports is only 1. The CRS is not transmitted in other subframes of the radio frame.

In the technical solution provided by this embodiment, a base station uses MBSFN subframe configuration signaling to send CRS transmission configuration information to user equipment to indicate a region for transmitting a CRS in a time domain, and does not use additional signaling to notify the user equipment of the region for transmitting the CRS; without recognizing additional signaling, the user equipment can determine the region for transmitting the CRS, and further determine a configuration of a cell. Therefore, efficiency of determining the configuration of the cell by the user equipment is improved, complexity of determining the configuration of the cell by the UE is reduced, a signaling overhead is saved, and system compatibility is improved.

The following embodiments respectively describe how CRS transmission configuration information indicates, to user equipment by using a particular state of MBSFN subframe configuration signaling, a region for transmitting a CRS in a time domain. Meanings of all states of the MBSFN subframe configuration signaling are predefined. Optionally, the meanings of all states of the MBSFN configuration signaling are transmitted by a base station to the UE in advance.

FIG. 3 is a flowchart of another method for sending information according to an embodiment of the present invention. In this embodiment, MBSFN subframe configuration signaling is in a first state. A particular state in states of the MBSFN subframe configuration signaling is used to indicate the CRS transmission configuration information. That the CRS transmission configuration information is used to indicate, to user equipment, a region for transmitting the CRS in a time domain includes: the CRS transmission configuration information is used to indicate, to the user equipment, that the CRS is transmitted in a first-type subframe of the cell, and indicate, to the user equipment, that the CRS is not transmitted in a second-type subframe of the cell. In this case, the particular state in the states of the MBSFN subframe configuration signaling may be referred to as the first state of the MBSFN subframe configuration signaling. As shown in FIG. 3, the method provided by this embodiment includes:

Step 31: A base station determines MBSFN subframe configuration signaling according to a configuration of a cell, where a particular state in states of the MBSFN subframe configuration signaling is used to indicate the CRS transmission configuration information, where the CRS transmission configuration information is used to indicate, to user equipment, that a CRS is transmitted in a first-type subframe of the cell, and indicate, to the user equipment, that the CRS is not transmitted in a second-type subframe of the cell.

The first-type subframe and the second-type subframe are predefined or are configured by the base station for the user equipment; the first-type subframe is a subframe that is predefined or is configured by the base station for the user equipment and is used to transmit the CRS, and the second-type subframe is a subframe that is predefined or is configured by the base station for the user equipment and is not used to transmit the CRS.

Step 32: The base station sends the MBSFN subframe configuration signaling to the user equipment.

Step 33: The base station transmits the CRS in the first-type subframe of the cell, and does not transmit the CRS in the second-type subframe of the cell.

When the MBSFN subframe configuration signaling is in a first state, a reduced CRS (Reduced CRS, RCRS for short) is transmitted or a CRS with one antenna port is transmitted only in subframe 0 and subframe 5 in a radio frame, and the CRS is not transmitted in other subframes. Therefore, the first-type subframe includes subframes 0 and 5, and the second-type subframe includes any subframe except subframes 0 and 5. A quantity of CRS ports in the subframe for transmitting the CRS may be equal to 1. Optionally, the quantity of CRS ports in the subframe for transmitting the CRS may also be equal to 2 or 4.

The first state of the MBSFN subframe configuration signaling may be further used to indicate, to user equipment, and in particular, to user equipment that recognizes an NCT, that a corresponding serving cell of a corresponding carrier does not provide a service for conventional user equipment. The conventional user equipment may be user equipment that does not support the NCT.

The first state of the MBSFN subframe configuration signaling may have the following usage: an MBSFN subframe indicated by the MBSFN subframe configuration signaling is the second-type subframe, and a non-MBSFN subframe is the first-type subframe. Optionally, all states corresponding to the first state are NCT carrier states, that is, the CRS or RCRS is transmitted only in subframe 0 and subframe 5, and the CRS is not transmitted in other subframes. The RCRS is a CRS with only one port.

In this embodiment, MBSFN subframe configuration signaling is used to indicate, to user equipment, a region for transmitting a CRS in a time domain, so that whether a carrier type of a cell is an NCT carrier or a conventional carrier can be further determined, without increasing additional signaling. Therefore, efficiency of determining a configuration of the cell by the UE is improved, and complexity of determining the configuration of the cell by the UE is reduced.

For example, a first state of the MBSFN subframe configuration signaling may be configured in the following manner: the first state may be one of all states except the following states: (1) a third state, and (2) a state in which a radio frame allocation period is one radio frame and a radio frame allocation offset is not zero. The first state may also be used to indicate a configuration of an MBSFN subframe to the UE. For the third state of the MBSFN subframe configuration signaling, refer to the following description.

FIG. 4 is a flowchart of still another method for sending information according to an embodiment of the present invention. In this embodiment, MBSFN subframe configuration signaling is in a second state. As shown in FIG. 4, the method provided by this embodiment includes:

Step 41: A base station determines MBSFN subframe configuration signaling according to a configuration of a cell, where a particular state in states of the MBSFN subframe configuration signaling is used to indicate the CRS transmission configuration information, where the CRS transmission configuration information is used to indicate, to user equipment, that a CRS is transmitted in a non-MBSFN subframe of the cell and in a non-MBSFN region of an MBSFN subframe of the cell.

Step 42: The base station sends the MBSFN subframe configuration signaling to the user equipment.

Step 43: The base station transmits the CRS in the non-MBSFN subframe of the cell and in the non-MBSFN region of the MBSFN subframe of the cell.

In particular states in the states of the MBSFN subframe configuration signaling, a state that indicates, to the user equipment, that the CRS is transmitted in the non-MBSFN subframe of the cell and in the non-MBSFN region of the MBSFN subframe of the cell, may be referred to as a second state of the MBSFN subframe configuration signaling.

When the MBSFN subframe configuration signaling is in the second state, a radio frame of the cell includes at least seven MBSFN subframes, and the particular state in the states of the MBSFN subframe configuration signaling is indicated by a state value of the MBSFN subframe configuration signaling in which a radio frame allocation period is one radio frame and a radio frame allocation offset is not zero.

The second state of the MBSFN subframe configuration signaling may be described by using a reserved or unused state of an MBSFN subframe configuration, for example, indicated by a state value of the MBSFN subframe configuration signaling in which the radio frame allocation period is one radio frame, the radio frame allocation offset is not zero, subframe allocation is a one-radio-frame allocation manner and six bits of the one-radio-frame allocation manner are all configured as 1. For example, the second state is indicated by a state value of the MBSFN subframe configuration signaling in which the radio frame allocation period is four radio frames, the radio frame allocation offset is greater than or equal to 4, the subframe allocation is a four-radio-frame allocation manner, and 24 bits of the four-radio-frame allocation manner are all configured as 1. For another example, the second state of the MBSFN subframe configuration signaling may be further indicated by a state value of the MBSFN subframe configuration signaling in which the radio frame allocation period is one radio frame, the radio frame allocation offset is not zero, the subframe allocation is the one-radio-frame allocation manner, and the six bits of the one-radio-frame allocation manner are configured as other values. Optionally, a part of subframes may be predefined as MBSFN subframes, and six bits of the subframe allocation may be used to configure configuration information about whether other subframes are used as MBSFN subframes. For example, subframes 2, 3, 4, 6, 7, and 8 are predefined as MBSFN subframes, and the six bits of the one-radio-frame allocation manner are used to indicate whether subframes 0, 1, 5, and 9 are MBSFN subframes. In addition, the subframe allocation may be further configured according to the four-radio-frame allocation manner. For example, a particular state in the 24 bits of the four-radio-frame allocation manner is used to indicate that more than six MBSFN subframes are included in at least one radio frame in four radio frames, and further, an additional information element may be used for description.

There are eight radio frame allocation offsets offset in total in the MBSFN subframe configuration signaling, where one non-zero radio frame allocation offset offset indentifies N MBSFN subframes and patterns pattern of the subframes. In a radio frame, when a quantity of MBSFN subframes is 7-10, there may be multiple different patterns, where the most important pattern of 7 MBSFN subframes includes 1, 2, 3, 4, 6, 7, and 8, or 1, 2, 3, 6, 7, 8, and 9; the most important pattern of 8 MBSFN subframes is 1, 2, 3, 4, 6, 7, 8, and 9; the most important pattern of 9 MBSFN subframes is 0, 1, 2, 3, 4, 6, 7, 8, and 9, or 1, 2, 3, 4, 5, 6, 7, 8, and 9; and the most important pattern of 10 MBSFN subframes is 0-9. The foregoing several MBSFN subframe configurations may be indicated by using a state in which the radio frame allocation period is one and the radio frame allocation offset offset is N, where $0<N<=7$.

In this embodiment, MBSFN subframe configuration signaling is used to indicate, to user equipment, a region for transmitting a CRS, and therefore, may indicate whether a state of a carrier is an NCT carrier or a conventional carrier, without increasing additional signaling. Therefore, efficiency of determining a configuration of a cell by the UE is improved, and complexity of determining the configuration of the cell by the UE is reduced. In addition, in this embodiment, the MBSFN subframe configuration signaling is further used to instruct the user equipment to increase a quantity of MBSFN subframes, which increases a service transmission rate in the MBSFN subframes.

For a third state of the MBSFN subframe configuration signaling, in particular states in states of the MBSFN subframe configuration signaling, a particular state in the states of the MBSFN subframe configuration signaling that indicates, to the user equipment, that a radio frame includes a maximum of six MBSFN subframes and that a CRS is transmitted in a non-MBSFN subframe of the cell and in a non-MBSFN region of an MBSFN subframe of the cell may be referred to as the third state of the MBSFN subframe configuration signaling. When the MBSFN subframe configuration signaling is in the third state, the cell may transmit a service for conventional UE. Optionally, a quantity of CRS ports is 1; or optionally, a quantity of CRS ports is a quantity of CRS ports that is obtained by using a physical broadcast channel (Physical Broadcast Channel, PBCH for short). For example, the third state of the MBSFN subframe configuration signaling may be configured in the following manner: a radio frame allocation period is one radio frame, a radio frame allocation offset is 0, subframe allocation is configured according to a one-radio-frame allocation manner, and six bits of the one-radio-frame allocation manner are all configured as 1; or a radio frame allocation period is one radio frame, a radio frame allocation offset is 0, subframe allocation is configured according to a four-radio-frame allocation manner, and 24 bits of the four-radio-frame allocation manner are configured as 1. The conventional user equipment may be user equipment that does not support the NCT. In this case, the NCT carrier may be used as a secondary carrier of the conventional user equipment, but the conventional user equipment receives a broadcast channel, a physical downlink control channel (Physical Downlink Control Channel, PDCCH for short), or the like from a primary carrier (non-NCT carrier) of the conventional user equipment. Therefore, a manner is provided: when the conventional user equipment needs to be served, a system parameter corresponding to the third state is configured for the NCT carrier; and when the conventional user equipment does not need to be served, a system parameter corresponding to the NCT carrier is configured, so that the NCT carrier can be used more flexibly and provide a service for the conventional user equipment.

Figure 5:
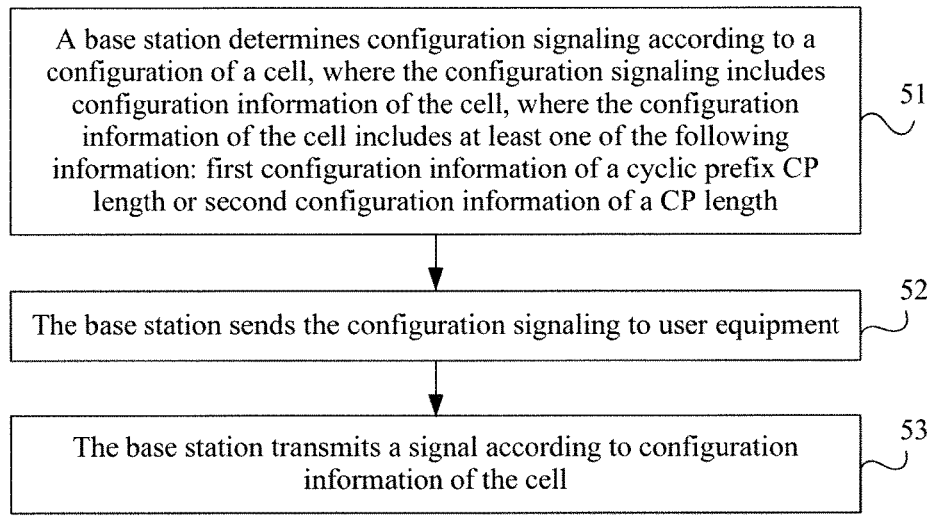
FIG. 5 is a flowchart of yet another method for sending information according to an embodiment of the present invention.
Figure 6A:
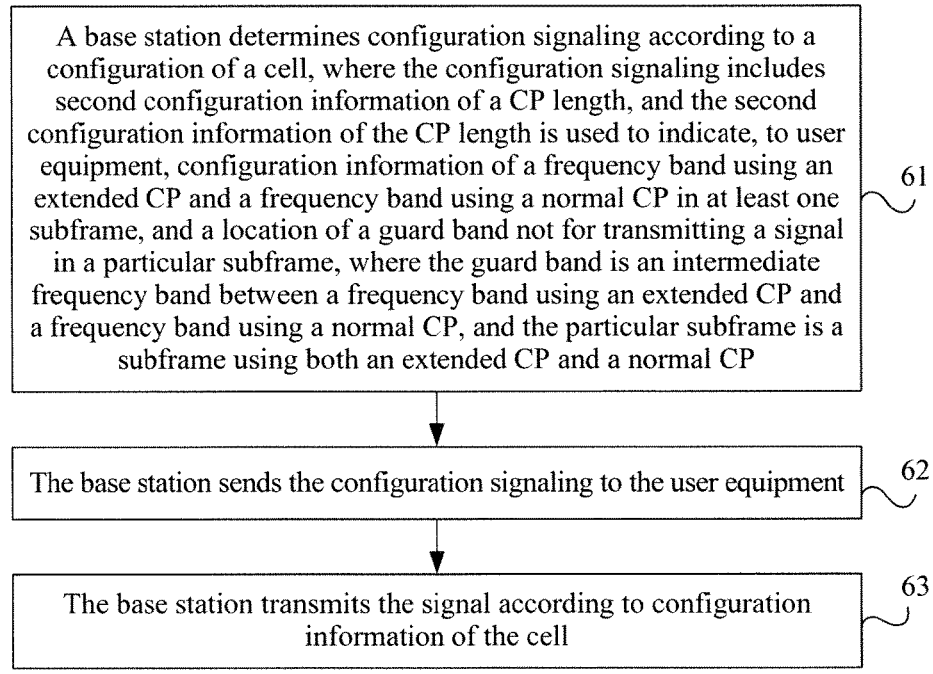
FIG. 6A is a flowchart of yet another method for sending information according to an embodiment of the present invention.
Figure 7:
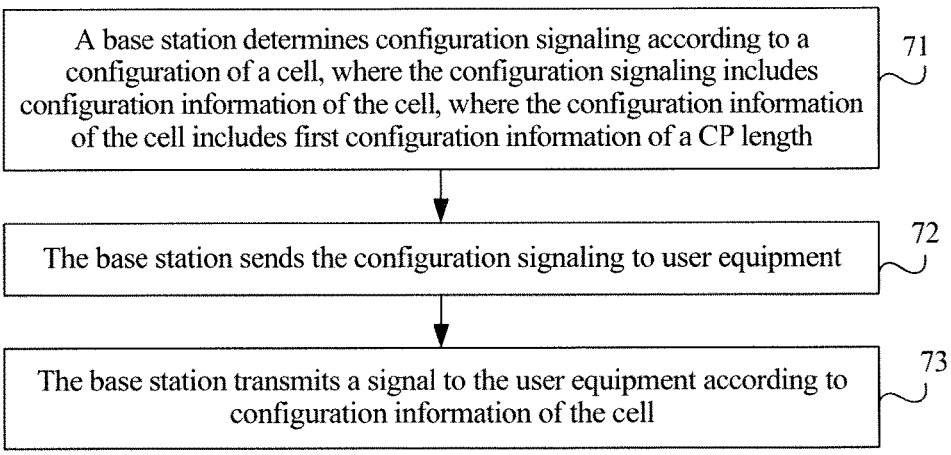
FIG. 7 is a flowchart of a method for sending information according to an embodiment of the present invention.

Embodiments corresponding to FIG. 5, FIG. 6A, and FIG. 7 mainly describe, from a perspective of a base station side, how to improve efficiency of determining a configuration of a cell by UE, by indicating configuration information of a CP in a subframe to the user equipment.

FIG. 5 is a flowchart of yet another method for sending information according to an embodiment of the present invention. As shown in FIG. 5, the method provided by this embodiment includes:

Step 51: A base station determines configuration signaling according to a configuration of a cell, where the configuration signaling includes configuration information of the cell, where the configuration information of the cell includes at least one of the following information: first configuration information of a cyclic prefix CP length or second configuration information of a CP length.

The first configuration information of the CP length is transmitted by using a system information block type 2 (System Information Block Type 2, SIB 2 for short) and used to indicate, to user equipment, configuration information of a subframe using an extended CP. The first configuration information of the CP length is used to indicate, to the user equipment, configuration information of a subframe using an extended CP, for example, indicate, to the user equipment, that in a radio frame, subframes 0, 4, 5, and 9 use a normal CP, and that subframes 1, 2, 3, 6, 7, and 8 use an extended CP. Therefore, the UE can directly and accurately obtain whether a CP actually used by each subframe is an extended CP or a normal CP, without blindly detecting the subframe or obtaining, according to a PDCCH detection result, whether a CP actually used by each subframe is an extended CP or a normal CP.

The second configuration information of the CP length is used to indicate, to the user equipment, configuration information of a frequency band using an extended CP and/or a frequency band using a normal CP in at least one subframe. By using the second configuration information of the CP length, the base station may indicate, to the user equipment, frequency division multiplexing of an extended CP and a normal CP in a subframe.

Step 52: The base station sends the configuration signaling to user equipment.

Step 53: The base station transmits a signal according to the configuration information of the cell. The signal transmitted by the base station may be a data signal or a control signal or a reference signal or the like, which is not limited herein.

If a base station indicates, to UE by using MBSFN subframe configuration signaling, which subframes may be MBSFN subframes, the subframes that may be MBSFN subframes do not necessarily transmit an MBMS service. When the UE is not sure whether an MBSFN subframe definitely transmits the MBMS service and the MBMS service is not scheduled for the UE, the UE can only blindly detect whether the MBSFN subframe uses an extended CP or a normal CP. In each MBSFN subframe, the UE may detect downlink control information (Downlink Control Information, DCI for short) of a control region. If the UE detects valid downlink scheduling information for the subframe, it is considered that any region of the subframe except the control region uses a normal CP; otherwise, it is considered that any region of the subframe except the control region uses an extended CP. Then, the UE detects a corresponding channel state information-reference signal (Channel State Information-Reference Signal, CSI-RS for short) and a channel state information interference measurement resource (Channel State Information Interference Measurement Resource, CSI-IMR for short) according to the CP length. Therefore, efficiency of detecting the CSI-RS and the CSI-IMR is affected.

However, in this embodiment, when a base station incorporates, in configuration information of a cell in configuration signaling, first configuration information of a CP length, for indicating, to user equipment, configuration information of a subframe using an extended CP, the user equipment can determine, without blindly detecting the MBSFN subframe, whether a symbol in the MBSFN subframe uses an extended CP or a normal CP, and therefore can directly detect a corresponding CSI-RS and CSI-IMR according to the configured CP length. Therefore, efficiency of determining a configuration of the cell by the UE is improved, complexity of determining the configuration of the cell by the UE is reduced, and efficiency of detecting the CSI-RS and CSI-IMR is improved.

The first configuration information of the CP length, transmitted by using a SIB 2, is used to indicate, to the user equipment, configuration information of a subframe using an extended CP, and may be used in an NCT carrier type. In the NCT carrier type, the UE can already determine, according to the carrier type, a subframe for transmitting a CRS and that the CRS is transmitted only in subframe 0/5. Therefore, definitely, no CRS is transmitted in subframes 1, 2, 3, 4, 6, 7, 8, and 9. In this case, the first configuration information of the CP length is indicated by multiplexing MBSFN subframe configuration signaling in the SIB 2, without using additional signaling, so that the UE determines a subframe using an extended CP. Therefore, an advantageous effect of saving a signaling overhead and reducing complexity of the UE may be achieved.

In an LTE system, the UE considers that a CP length used by each symbol in any region of an MBSFN subframe except a control region is the same and is the same in entire system bandwidth. When an MBMS service is transmitted in a subframe, even if a part of bandwidth is used for transmission, another part of bandwidth can only be idle and cannot be used for transmitting a non-MBMS service, or another part of bandwidth can use only an extended CP to transmit a non-MBMS service. A system capacity is limited by the extended CP, flexibility is limited, and efficiency of using radio resources is also limited. The MBMS service may be any service transmitted in the MBSFN subframe, for example, a multimedia broadcast service (Multimedia Broadcast and Multicast Service, MBMS for short) service, or a group communication (group communication) service.

However, in this embodiment, when the base station incorporates, in the configuration information of the cell in the configuration signaling, second configuration information of a CP length, for indicating, to the user equipment, configuration information of a frequency band using an extended CP and/or a frequency band using a normal CP in at least one subframe, frequency division multiplexing may be performed on an MBMS service and a non-MBMS service in a subframe, and a system capacity does not need to be limited by the extended CP. Therefore, resource utilization of a service using a normal CP is improved, flexibility of using radio resources is improved, a capacity of a subframe using an extended CP is increased, and resource utilization of a service using a normal CP is improved. Because the second configuration information of the CP length indicates, to the user equipment, the configuration information of the frequency band using the extended CP and/or the frequency band using the normal CP, efficiency of determining the configuration of the cell by the UE is improved, and complexity of implementation of the UE is reduced.

FIG. 6A is a flowchart of yet another method for sending information according to an embodiment of the present invention. This embodiment mainly describes how to perform frequency division multiplexing on an MBMS service and a non-MBMS service in a subframe. As shown in FIG. 6A, the method provided by this embodiment includes:

Step 61: A base station determines configuration signaling according to a configuration of a cell, where the configuration signaling includes second configuration information of a CP length, and the second configuration information of the CP length is used to indicate, to user equipment, configuration information of a frequency band using an extended CP and a frequency band using a normal CP in at least one subframe, and a location of a guard band not for transmitting a signal in a particular subframe, where the guard band is an intermediate frequency band between a frequency band using an extended CP and a frequency band using a normal CP, and the particular subframe is a subframe using both an extended CP and a normal CP.

The second configuration information of the CP length may be used to indicate, to the user equipment, at least two of configuration information of the frequency band using the extended CP, configuration information of the frequency band using the normal CP, and configuration information of the guard band. When the second configuration information of the CP length is used to transmit only two of the foregoing configuration information, on a basis of the configuration information, the UE may calculate third configuration information according to downlink transmission bandwidth.

Step 62: The base station sends the configuration signaling to the user equipment.

Step 63: The base station transmits the signal according to configuration information of the cell.

Figure 6B:
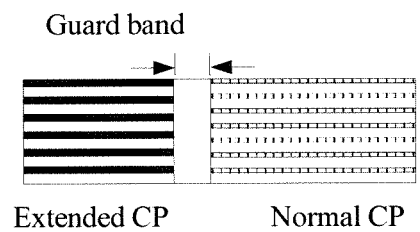
FIG. 6B is a schematic diagram of a frequency band disposed with a guard band according to an embodiment of the present invention.

To avoid mutual interference between an MBMS service and a non-MBMS service, as shown in FIG. 6B, in this embodiment, an intermediate frequency band between a frequency band using an extended CP and a frequency band using a normal CP is disposed as a guard band not for transmitting a signal. That is, no signal is transmitted in the intermediate frequency band between the frequency band using the extended CP and the frequency band using the normal CP. Sizes of sub bandwidth using extended CPs in different subframes are independent, and may be the same, or may be different; likewise, sizes of sub bandwidth using normal CPs in different subframes are independent, and may be the same, or may be different. Sizes of guard bands in different subframes are independent. A guard band may exist only in a part of subframes or a part of symbols. Because an intermediate frequency band between a frequency band using an extended CP and a frequency band using a normal CP is used as a guard band in a particular subframe, interference between a signal using a normal CP and a signal using an extended CP may be controlled effectively, and a feasible method is provided for efficient use of radio resources.

When the location of the guard band in the particular subframe is indicated to the user equipment, the second configuration information of the CP length may indicate a start position of the guard band and a length of the guard band to the user equipment; or may indicate a start position and an end position of the guard band to the user equipment; or may indicate a center position of the guard band and a length of the guard band to the user equipment; or may notify the user equipment that all frequency bands except the frequency band using the extended CP and the frequency band using the normal CP are guard bands, which is not limited herein.

The base station may use the following signaling manner to notify the UE of locations of the extended CP, the normal CP, and/or the guard band in a frequency domain:

--- frequency-domain CP configuration information {
   location of the extended CP (which, for example, may be indicated in a manner similar to that of resource allocation)
   size of the guard band (which, for example, may be indicated in a manner similar to that of resource allocation)
   location of the normal CP (which, for example, may be indicated in a manner similar to that of resource allocation)
}

---

In this embodiment, in at least one subframe, a transmission frequency band is divided into at least two frequency sub-bands: a frequency band using an extended CP and a frequency band using a normal CP, where CPs used in different frequency sub-bands may be different. When CPs used by two adjacent frequency sub-bands are different, a guard band is added between the two frequency sub-bands, where the guard band is not used to transmit a signal.

Figure 6C:
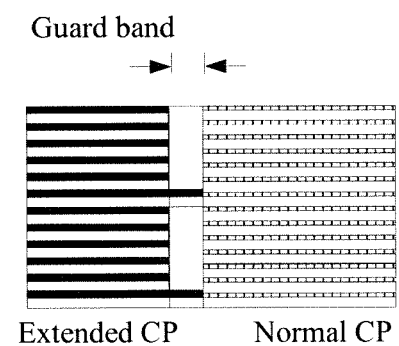
FIG. 6C is a schematic diagram of another frequency band disposed with a guard band according to an embodiment of the present invention.

Optionally, no guard band is disposed in a last symbol of each timeslot in a particular subframe using both an extended CP and a normal CP. As shown in FIG. 6C, no guard band exists in the last symbol of each timeslot in the particular subframe. Correspondingly, that the base station transmits information to the user equipment according to configuration information of a serving cell includes: the base station transmits the information in the particular subframe to the user equipment according to the configuration information of the serving cell, and does not transmit the signal in the intermediate frequency band between the frequency band using the extended CP and the frequency band using the normal CP in the particular subframe, where the guard band is not disposed in the last symbol of each timeslot in the particular subframe, so that the entire downlink transmission bandwidth may be used for signal transmission.

Figure 6D:
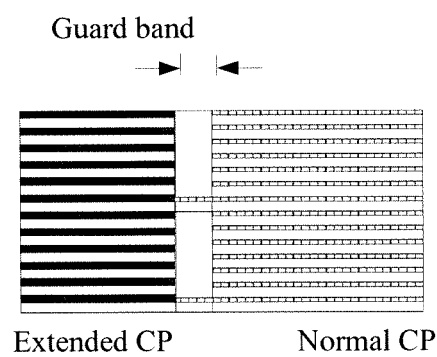
FIG. 6D is a schematic diagram of still another frequency band disposed with a guard band according to an embodiment of the present invention.

Optionally, the second configuration information of the CP length is further used to indicate, to the user equipment, location information and/or bandwidth information of guard bands in different symbols in the particular subframe. As shown in FIG. 6D, in the last symbol of each slot in the particular subframe, bandwidth of a guard band is three subcarriers, but in other symbols, bandwidth of a guard band is five subcarriers.

In this embodiment, a particular subframe uses both an extended CP and a normal CP, an MBMS service is transmitted in a frequency band of the extended CP of the particular subframe, and a non-MBMS service is transmitted in a frequency band of the normal CP of the particular subframe. Therefore, frequency division multiplexing may be performed on the MBMS service and the non-MBMS service in a particular subframe, and a system capacity does not need to be limited by the extended CP. Therefore, resource utilization of a service using a normal CP is improved, and flexibility of using radio resources is improved. Because a base station uses second configuration information of a CP length to indicate, to UE, that both the extended CP and the normal CP are used in the particular subframe, efficiency of determining a configuration of a cell by the UE is improved, and complexity of determining the configuration of the cell by the UE is reduced. Because an intermediate frequency band between a frequency band using an extended CP and a frequency band using a normal CP is used as a guard band in the particular subframe, interference between a signal using a normal CP and a signal using an extended CP may be controlled effectively, and a feasible method is provided for efficient use of radio resources.

Optionally, in this embodiment, the configuration signaling sent by the base station to the user equipment may be MBSFN subframe configuration signaling. Further, when the configuration signaling sent by the base station to the user equipment is the MBSFN subframe configuration signaling, configuration information of the cell in the MBSFN subframe configuration signaling may further include CRS transmission configuration information. The CRS transmission configuration information may be indicated by a particular state in states of the MBSFN subframe configuration signaling. For details, refer to descriptions in the embodiments corresponding to FIG. 3 and FIG. 4.

Optionally, in this embodiment, the configuration information of the cell in the configuration signaling sent by the base station to the user equipment may further include first configuration information of the CP length.

FIG. 7 is a flowchart of a method for sending information according to an embodiment of the present invention. In this embodiment, signaling of configuration information of a serving cell, delivered by a base station to user equipment, may be MBSFN subframe configuration signaling, or may be other configuration signaling. As shown in FIG. 7, the method provided by this embodiment includes:

Step 71: A base station determines configuration signaling according to a configuration of a cell, where the configuration signaling includes configuration information of the cell, where the configuration information of the cell includes first configuration information of a CP length.

The first configuration information of the CP length, transmitted by using a SIB 2, is used to indicate, to user equipment, configuration information of a subframe using an extended CP, for example, indicate, to the user equipment, that in a radio frame, subframes 0, 4, 5, and 9 use a normal CP, and that subframes 1, 2, 3, 6, 7, and 8 use an extended CP. To notify the UE, an information element in the SIB 2 may be used, for example, an MBSFN subframe configuration information element is used. MBSFN subframe pattern configuration information in an MBSFN is used to indicate a number of a subframe using an extended CP, or another information element is reused or a new information element is used to indicate a number of a subframe using an extended CP. Therefore, the UE can directly and accurately obtain whether a CP actually used by each subframe is an extended CP or a normal CP, without blindly detecting the subframe or obtaining, according to a PDCCH detection result, whether a CP actually used by each subframe is an extended CP or a normal CP.

Step 72: The base station sends the configuration signaling to user equipment.

Step 73: The base station transmits a signal to the user equipment according to configuration information of the cell.

Optionally, in the embodiment of the present invention, the configuration signaling sent by the base station to the user equipment may be MBSFN subframe configuration signaling. Further, when the configuration signaling sent by the base station to the user equipment is the MBSFN subframe configuration signaling, configuration information of the cell in the MBSFN subframe configuration signaling may further include CRS transmission configuration information. The CRS transmission configuration information may be indicated by a particular state in states of the MBSFN subframe configuration signaling. For details, refer to descriptions in the embodiments corresponding to FIG. 3 and FIG. 4. Therefore, when the configuration information sent by the base station to the user equipment is the MBSFN subframe configuration signaling, the base station indicates, to the user equipment by using the MBSFN subframe configuration signaling, a region for transmitting a CRS in a time domain, and may further determine whether a carrier type of the cell is an NCT carrier or a conventional carrier, without increasing additional signaling. Therefore, efficiency of determining the configuration of the cell by the UE is improved, and complexity of determining the configuration of the cell by the UE is reduced.

Optionally, in the embodiment of the present invention, the configuration information of the cell in the configuration signaling sent by the base station to the user equipment may further include second configuration information of the CP length.

In this embodiment, when a base station incorporates, in configuration information of a cell in configuration signaling, first configuration information of a CP length, for indicating, to user equipment, configuration information of a subframe using an extended CP, the user equipment can determine, without blindly detecting the MBSFN subframe, whether a symbol in the MBSFN subframe uses an extended CP or a normal CP, and therefore can directly detect a corresponding CSI-RS and CSI-IMR according to the configured CP length. Therefore, efficiency of determining a configuration of the cell by the UE is improved, complexity of determining the configuration of the cell by the UE is reduced, and efficiency of detecting the CSI-RS and CSI-IMR is improved.

It should be noted that in the embodiment of the present invention, in addition to the CRS transmission configuration information, the first configuration information of the CP length and/or the second configuration information of the CP length may also be indicated by a particular state in the states of the MBSFN subframe configuration signaling. In the embodiment of the present invention, the first configuration information of the CP length or the second configuration information of the CP length is indicated by a fourth state of the MBSFN subframe configuration signaling. That is, the base station uses a particular state in the states of the MBSFN subframe configuration signaling to indicate, to the user equipment, the configuration information of the subframe using the extended CP, for example, an MBSFN subframe indicated by a state value of the MBSFN subframe configuration signaling is the subframe using the extended CP; or to indicate, to the user equipment, configuration information of a frequency band using an extended CP and/or a frequency band using a normal CP in at least one subframe, for example, an MBSFN subframe indicated by a state value of the MBSFN subframe configuration signaling is a subframe including the frequency band using the extended CP and the frequency band using the normal CP. Because the second configuration information of the CP length exists, frequency division multiplexing may be performed on an MBMS service and a non-MBMS service in a subframe, and a system capacity does not need to be limited by the extended CP. Therefore, resource utilization of a service using a normal CP is improved, flexibility of using radio resources is improved, a capacity of a subframe using an extended CP is increased, and resource utilization of a service using a normal CP is improved. Because the second configuration information of the CP length indicates, to the user equipment, the configuration information of the frequency band using the extended CP and/or the frequency band using the normal CP, efficiency of determining the configuration of the cell by the UE is improved, and complexity of implementation of the UE is reduced.

It should be noted that: in the embodiment of the present invention, the states of the MBSFN subframe configuration signaling include a first state, a second state, a third state, and a fourth state, or the states of the MBSFN subframe configuration signaling include only a third state and a first state, or the states of the MBSFN subframe configuration signaling include only a third state and a second state, or the states of the MBSFN subframe configuration signaling include only a first state, a second state, and a third state, or the states of the MBSFN subframe configuration signaling include only a third state, a first state, and a fourth state, or the states of the MBSFN subframe configuration signaling include only a third state, a second state, and a fourth state. Therefore, a particular state of the MBSFN subframe configuration signaling is the third state, and/or, the particular state is the first state, and/or, the particular state is the second state, and/or, the particular state is the fourth state. The base station may use the states of the MBSFN subframe configuration signaling in combination. For example, combination manner 1: the base station uses only the third state and the first state; combination manner 2: the base station uses only the third state and the second state; combination manner 3: the base station uses the first state, the second state, and the third state in combination; combination manner 4: the base station uses the third state, the first state, and the fourth state in combination; combination manner 5: the base station uses the third state, the second state, and the fourth state in combination. All states in the embodiment of the present invention may be all states of MBSFN signaling, or particular states of MBSFN signaling. When all the states are particular states, meanings of some states may be the same as meanings of existing states. Optionally, a state of the MBSFN subframe configuration signaling may also belong to the fourth state when belonging to the first state or the second state or the third state.

Figure 8:
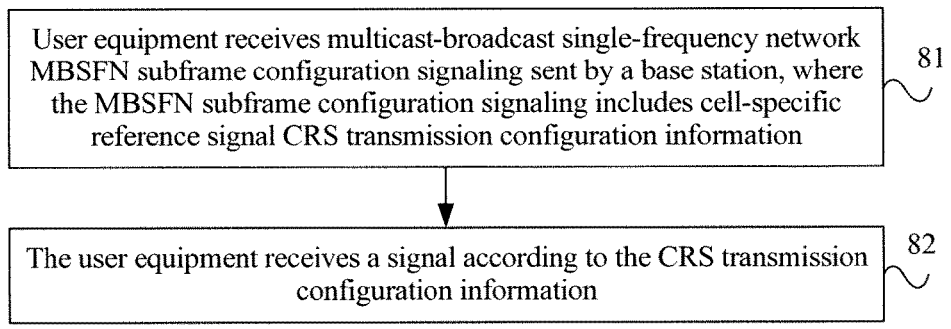
FIG. 8 is a flowchart of a method for receiving information according to an embodiment of the present invention.
Figure 9:
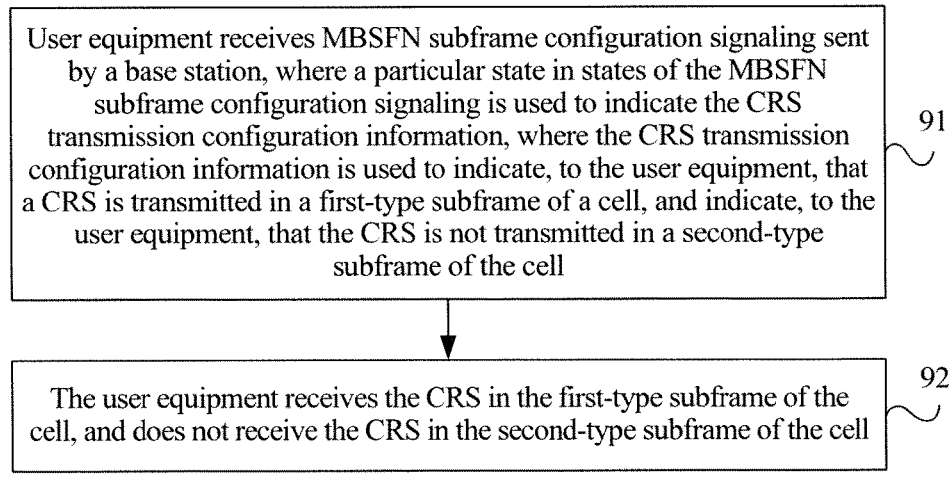
FIG. 9 is a flowchart of another method for receiving information according to an embodiment of the present invention.
Figure 10:
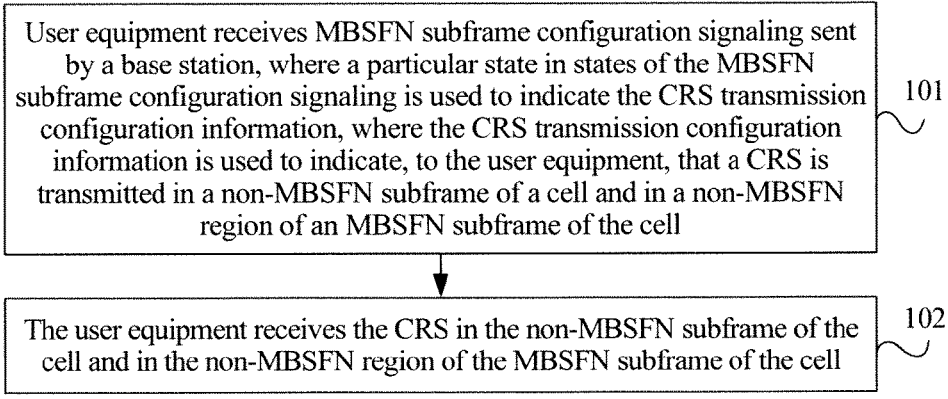
FIG. 10 is a flowchart of still another method for receiving information according to an embodiment of the present invention.

Method embodiments corresponding to FIG. 8, FIG. 9, and FIG. 10 mainly describe, from a perspective of user equipment, how to improve efficiency of determining a configuration of a cell by the UE, by indicating CRS transmission configuration information in a subframe to the user equipment.

FIG. 8 is a flowchart of a method for receiving information according to an embodiment of the present invention. As shown in FIG. 8, the method provided by this embodiment includes:

Step 81: User equipment receives multicast-broadcast single-frequency network MBSFN subframe configuration signaling sent by a base station, where the MBSFN subframe configuration signaling includes cell-specific reference signal CRS transmission configuration information, where the CRS transmission configuration information is used to indicate, to the user equipment, a region for transmitting a CRS in a time domain.

The CRS transmission configuration information is used to indicate, to the user equipment, the region for transmitting the CRS in the time domain. The region for transmitting the CRS in the time domain includes a subframe for transmitting the CRS and the region for transmitting the CRS in the subframe, where the region for transmitting the CRS may be a part of symbols in a subframe, for example, a non-MBSFN region of an MBSFN subframe.

The MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

In a piece of MBSFN subframe configuration signaling, a state of the MBSFN subframe configuration signaling is used to provide an indication for the UE.

For example, the N bits of the MBSFN subframe configuration signaling carry the following parameters: MBSFN subframe configuration (MBSFN subframe configuration), radio frame allocation period (radio frame allocation period), radio frame allocation offset (radio frame Allocation Offset), and subframe allocation (subframe Allocation). The subframe allocation is one of a one-radio-frame (one Frame) allocation manner and a four-radio-frame (four Frames) allocation manner. Particular states in the states of the MBSFN subframe configuration signaling are indicated by values of the foregoing parameters in the MBSFN subframe configuration signaling.

Optionally, the states of the MBSFN subframe configuration signaling include but are not limited to a state in which a radio frame includes a maximum of six MBSFN subframes.

A type of the MBSFN subframe configuration is sequence (SEQUENCE). The radio frame allocation period is a parameter of an enumeration type, and its value is one of {n1, n2, n4, n8, n16, n32}, where n1/m2/n4/n8/n16/n32 represents that the radio frame period is 1/2/4/8/16/32 radio frames. A type of the radio frame allocation offset is integer (INTEGER), and a value range is INTEGER (0-7), namely, integers from 0 to 7, where 0//1/2/3/4/5/6/7 represents that the offset is 0//1/2/3/4/5/6/7 radio frames. A type of the subframe allocation is choice (CHOICE), and a value of the subframe allocation is either the one-radio-frame allocation manner or the four-radio-frame allocation manner. A type of the one-radio-frame allocation manner is bit string (BIT STRING), and a length thereof is SIZE(6), where bit 0/1/2/3/4/5 represents whether subframe 1/2/3/6/7/8 is an MBSFN subframe, where 1 represents an MBSFN subframe and 0 represents a non-MBSFN subframe. A type of the four-radio-frame allocation manner is BIT STRING, and a length thereof is SIZE(24), where bits 0-5, 6-11, 12-17, and 18-23 respectively represent MBSFN subframe configurations in radio frames 0, 1, 2, and 3 in the radio frame period.

Step 82: The user equipment receives a signal according to the CRS transmission configuration information.

The received signal may be a data signal or a control signal or a reference signal or the like, which is not limited herein.

A base station may use additional signaling to notify user equipment (User Equipment, UE for short) of whether a carrier type of a cell is a conventional carrier type or a new carrier type (New Carrier Type, NCT for short), and further determine a subframe and a symbol for transmitting a CRS. Moreover, only UE that recognizes the new carrier type can recognize the additional signaling. Therefore, efficiency of determining a configuration of the cell by the UE is reduced, a signaling overhead is increased, and system compatibility is reduced. In the conventional carrier type, the CRS is definitely transmitted in a non-MBSFN subframe, and the CRS is definitely transmitted in a control region of an MBSFN subframe, but in the MBSFN subframe, the CRS is not transmitted in any region except the control region. In the new carrier type (New Carrier Type, NCT for short), the CRS is replaced with a reduced CRS (Reduced CRS, RCRS for short). For example, the CRS is transmitted only in subframe 0 and subframe 5 of each radio frame, and a quantity of CRS ports is only 1. The CRS is not transmitted in other subframes of the radio frame.

In the technical solution provided by this embodiment, a base station uses MBSFN subframe configuration signaling to send CRS transmission configuration information to user equipment to indicate a region for transmitting a CRS in a time domain, and does not use additional signaling to notify the user equipment of the region for transmitting the CRS; without recognizing additional signaling, the user equipment can determine the region for transmitting the CRS, and further determine a configuration of a cell. Therefore, efficiency of determining the configuration of the cell by the user equipment is improved, complexity of determining the configuration of the cell by the UE is reduced, a signaling overhead is saved, and system compatibility is improved.

The following embodiments respectively describe how CRS transmission configuration information indicates, to user equipment by using a particular state of MBSFN subframe configuration signaling, a region for transmitting a CRS in a time domain. Meanings of all states of the MBSFN subframe configuration signaling are predefined. Optionally, the meanings of all states of the MBSFN configuration signaling are transmitted by a base station to the UE in advance.

FIG. 9 is a flowchart of another method for receiving information according to an embodiment of the present invention. In this embodiment, MBSFN subframe configuration signaling is in a first state. A particular state in states of the MBSFN subframe configuration signaling is used to indicate the CRS transmission configuration information. That the CRS transmission configuration information is used to indicate, to user equipment, a region for transmitting the CRS in a time domain includes: the CRS transmission configuration information is used to indicate, to the user equipment, that the CRS is transmitted in a first-type subframe of the cell, and indicate, to the user equipment, that the CRS is not transmitted in a second-type subframe of the cell. In this case, the particular state in the states of the MBSFN subframe configuration signaling may be referred to as the first state of the MBSFN subframe configuration signaling. As shown in FIG. 10, the method provided by this embodiment includes:

Step 91: User equipment receives MBSFN subframe configuration signaling sent by a base station, where a particular state in states of the MBSFN subframe configuration signaling is used to indicate the CRS transmission configuration information, where the CRS transmission configuration information is used to indicate, to the user equipment, that a CRS is transmitted in a first-type subframe of a cell, and indicate, to the user equipment, that the CRS is not transmitted in a second-type subframe of the cell.

The first-type subframe and the second-type subframe are predefined or are configured by the base station for the user equipment; the first-type subframe is a subframe that is predefined or is configured by the base station for the user equipment and is used to transmit the CRS, and the second-type subframe is a subframe that is predefined or is configured by the base station for the user equipment and is not used to transmit the CRS.

Step 92: The user equipment receives the CRS in the first-type subframe of the cell, and does not receive the CRS in the second-type subframe of the cell.

When the MBSFN subframe configuration signaling is in a first state, a reduced CRS (Reduced CRS, RCRS for short) or a tracking reference signal (Tracking Reference Signal, TRS for short) is transmitted or a CRS with one antenna port is transmitted only in subframe 0 and subframe 5 in a radio frame, and the CRS is not transmitted in other subframes. Therefore, the first-type subframe includes subframes 0 and 5, and the second-type subframe includes any subframe except subframes 0 and 5. A quantity of CRS ports in the subframe for transmitting the CRS may be equal to 1. Optionally, the quantity of CRS ports in the subframe for transmitting the CRS may also be equal to 2 or 4.

The first state of the MBSFN subframe configuration signaling may be further used to indicate, to user equipment, and in particular, to user equipment that recognizes an NCT, that a corresponding serving cell of a corresponding carrier does not provide a service for conventional user equipment. The conventional user equipment may be user equipment that does not support the NCT.

The first state of the MBSFN subframe configuration signaling may have the following usage: an MBSFN subframe indicated by the MBSFN subframe configuration signaling is the second-type subframe, and a non-MBSFN subframe is the first-type subframe. Optionally, all states corresponding to the first state are NCT carrier states, that is, the CRS or RCRS is transmitted only in subframe 0 and subframe 5, and the CRS is not transmitted in other subframes. The RCRS is a CRS with only one port.

In this embodiment, a base station uses MBSFN subframe configuration signaling to indicate, to user equipment, a region for transmitting a CRS in a time domain, so that whether a carrier type of a cell is an NCT carrier or a conventional carrier can be further determined, without increasing additional signaling. Therefore, efficiency of determining a configuration of the cell by the UE is improved, and complexity of determining the configuration of the cell by the UE is reduced.

For example, a first state of the MBSFN subframe configuration signaling may be configured in the following manner: the first state may be one of all states except the following states: (1) a third state, and (2) a state in which a radio frame allocation period is one radio frame and a radio frame allocation offset is not zero. The first state may also be used to indicate a configuration of an MBSFN subframe to the UE. For the third state of the MBSFN subframe configuration signaling, refer to the following description.

FIG. 10 is a flowchart of still another method for receiving information according to an embodiment of the present invention. In this embodiment, MBSFN subframe configuration signaling is in a second state. As shown in FIG. 10, the method provided by this embodiment includes:

Step 101: User equipment receives MBSFN subframe configuration signaling sent by a base station, where a particular state in states of the MBSFN subframe configuration signaling is used to indicate the CRS transmission configuration information, where the CRS transmission configuration information is used to indicate, to the user equipment, that a CRS is transmitted in a non-MBSFN subframe of a cell and in a non-MBSFN region of an MBSFN subframe of the cell.

Step 102: The user equipment receives the CRS in the non-MBSFN subframe of the cell and in the non-MBSFN region of the MBSFN subframe of the cell.

In particular states in the states of the MBSFN subframe configuration signaling, a state that indicates, to the user equipment, that the CRS is transmitted in the non-MBSFN subframe of the cell and in the non-MBSFN region of the MBSFN subframe of the cell, may be referred to as a second state of the MBSFN subframe configuration signaling. When the MBSFN subframe configuration signaling is in the second state, a radio frame of the cell includes at least seven MBSFN subframes, and the particular state in the states of the MBSFN subframe configuration signaling is indicated by a state value of the MBSFN subframe configuration signaling in which a radio frame allocation period is one radio frame and a radio frame allocation offset is not zero.

The second state of the MBSFN subframe configuration signaling may be described by using a reserved or unused state of an MBSFN subframe configuration, for example, indicated by a state value of the MBSFN subframe configuration signaling in which the radio frame allocation period is one radio frame, the radio frame allocation offset is not zero, subframe allocation is a one-radio-frame allocation manner and six bits of the one-radio-frame allocation manner are all configured as 1. For example, the second state is indicated by a state value of the MBSFN subframe configuration signaling in which the radio frame allocation period is four radio frames, the radio frame allocation offset is greater than or equal to 4, the subframe allocation is a four-radio-frame allocation manner, and 24 bits of the four-radio-frame allocation manner are all configured as 1. For another example, the second state of the MBSFN subframe configuration signaling may be further indicated by a state value of the MBSFN subframe configuration signaling in which the radio frame allocation period is one radio frame, the radio frame allocation offset is not zero, the subframe allocation is the one-radio-frame allocation manner, and the six bits of the one-radio-frame allocation manner are configured as other values. Optionally, a part of subframes may be predefined as MBSFN subframes, and six bits of the subframe allocation may be used to configure configuration information about whether other subframes are used as MBSFN subframes. For example, subframes 2, 3, 4, 6, 7, and 8 are predefined as MBSFN subframes, and the six bits of the one-radio-frame allocation manner are used to indicate whether subframes 0, 1, 5, and 9 are MBSFN subframes. In addition, the subframe allocation may be further configured according to the four-radio-frame allocation manner. For example, a particular state in the 24 bits of the four-radio-frame allocation manner is used to indicate that more than six MBSFN subframes are included in at least one radio frame in four radio frames, and further, an additional information element may be used for description.

There are eight radio frame allocation offsets offset in total in the MBSFN subframe configuration signaling, where one non-zero radio frame allocation offset offset indentifies N MBSFN subframes and patterns of the subframes. In a radio frame, when a quantity of MBSFN subframes is 7-10, there may be multiple different patterns, where the most important pattern of 7 MBSFN subframes includes 1, 2, 3, 4, 6, 7, and 8, or 1, 2, 3, 6, 7, 8, and 9; the most important pattern of 8 MBSFN subframes is 1, 2, 3, 4, 6, 7, 8, and 9; the most important pattern of 9 MBSFN subframes is 0, 1, 2, 3, 4, 6, 7, 8, and 9, or 1, 2, 3, 4, 5, 6, 7, 8, and 9; and the most important pattern of 10 MBSFN subframes is 0-9. The foregoing several MBSFN subframe configurations may be indicated by using a state in which the radio frame allocation period is one and the radio frame allocation offset offset is N, where 0<N<=7.

In this embodiment, MBSFN subframe configuration signaling is used to indicate, to user equipment, a region for transmitting a CRS, and therefore, may indicate whether a state of a carrier is an NCT carrier or a conventional carrier, without increasing additional signaling. Therefore, efficiency of determining a configuration of a cell by the UE is improved, and complexity of determining the configuration of the cell by the UE is reduced. In addition, in this embodiment, the MBSFN subframe configuration signaling is further used to instruct the user equipment to increase a quantity of MBSFN subframes, which increases a service transmission rate in the MBSFN subframes.

For a third state of the MBSFN subframe configuration signaling, in particular states in states of the MBSFN subframe configuration signaling, a particular state in the states of the MBSFN subframe configuration signaling that indicates, to the user equipment, that a radio frame includes a maximum of six MBSFN subframes and that a CRS is transmitted in a non-MBSFN subframe of the cell and in a non-MBSFN region of an MBSFN subframe of the cell may be referred to as the third state of the MBSFN subframe configuration signaling. When the MBSFN subframe configuration signaling is in the third state, the cell may transmit a service for conventional UE. Optionally, a quantity of CRS ports is 1; or optionally, a quantity of CRS ports is a quantity of CRS ports that is obtained by using a physical broadcast channel (Physical Broadcast Channel, PBCH for short). For example, the third state of the MBSFN subframe configuration signaling may be configured in the following manner: a radio frame allocation period is one radio frame, a radio frame allocation offset is 0, subframe allocation is configured according to a one-radio-frame allocation manner, and six bits of the one-radio-frame allocation manner are all configured as 1; or a radio frame allocation period is one radio frame, a radio frame allocation offset is 0, subframe allocation is configured according to a four-radio-frame allocation manner, and 24 bits of the four-radio-frame allocation manner are configured as 1. The conventional user equipment may be user equipment that does not support the NCT. In this case, the NCT carrier may be used as a secondary carrier of the conventional user equipment, but the conventional user equipment receives a broadcast channel, a physical downlink control channel (Physical Downlink Control Channel, PDCCH for short), or the like from a primary carrier (non-NCT carrier) of the conventional user equipment. Therefore, a manner is provided: when the conventional user equipment needs to be served, a system parameter corresponding to the third state is configured for the NCT carrier; and when the conventional user equipment does not need to be served, a system parameter corresponding to the NCT carrier is configured, so that the NCT carrier can be used more flexibly and provide a service for the conventional user equipment.

Figure 11:
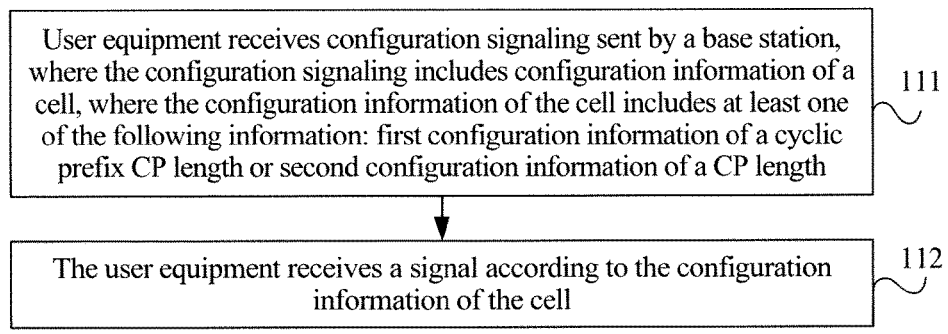
FIG. 11 is a flowchart of yet another method for receiving information according to an embodiment of the present invention.
Figure 12:
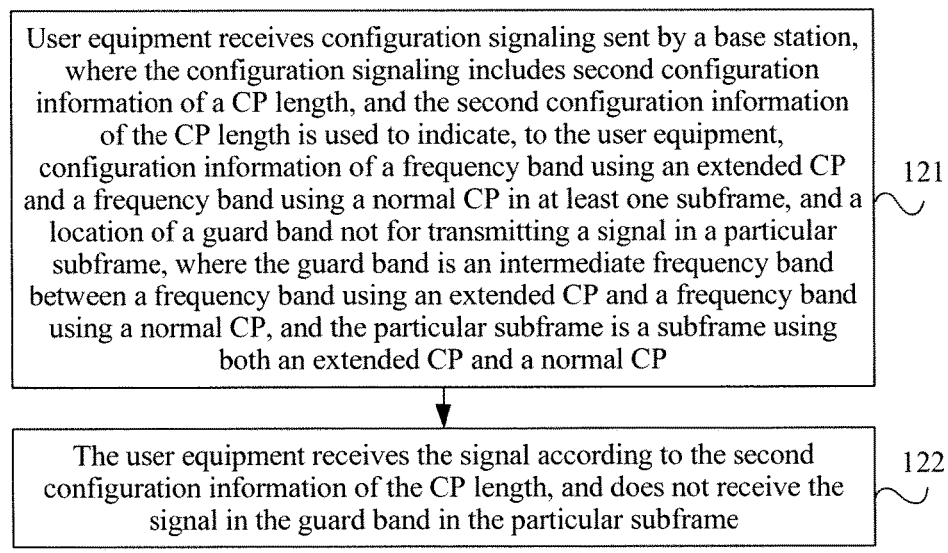
FIG. 12 is a flowchart of yet another method for receiving information according to an embodiment of the present invention.
Figure 13:
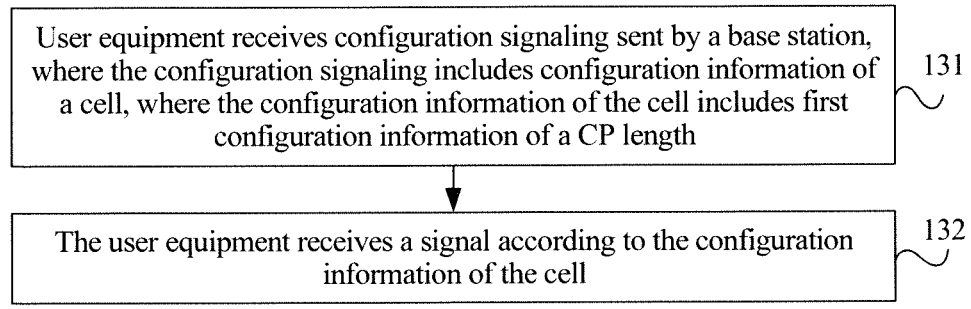
FIG. 13 is a flowchart of yet another method for receiving information according to an embodiment of the present invention.

Embodiments corresponding to FIG. 11, FIG. 12, and FIG. 13 mainly describe, from a perspective of a base station side, how to improve efficiency of determining a configuration of a cell by UE, by indicating configuration information of a CP in a subframe to the user equipment.

FIG. 11 is a flowchart of yet another method for receiving information according to an embodiment of the present invention. As shown in FIG. 11, the method provided by this embodiment includes:

Step 111: User equipment receives configuration signaling sent by a base station, where the configuration signaling includes configuration information of a cell, where the configuration information of the cell includes at least one of the following information: first configuration information of a cyclic prefix CP length or second configuration information of a CP length. The configuration signaling is determined by the base station according to a configuration of the cell.

The first configuration information of the CP length is transmitted by using a system information block type 2 (System Information Block Type2, SIB 2 for short) and used to indicate, to the user equipment, configuration information of a subframe using an extended CP. The first configuration information of the CP length is used to indicate, to the user equipment, configuration information of a subframe using an extended CP, for example, indicate, to the user equipment, that in a radio frame, subframes 0, 4, 5, and 9 use a normal CP, and that subframes 1, 2, 3, 6, 7, and 8 use an extended CP. Therefore, the UE can directly and accurately obtain whether a CP actually used by each subframe is an extended CP or a normal CP, without blindly detecting the subframe or obtaining, according to a PDCCH detection result, whether a CP actually used by each subframe is an extended CP or a normal CP.

The second configuration information of the CP length is used to indicate, to the user equipment, configuration information of a frequency band using an extended CP and/or a frequency band using a normal CP in at least one subframe. By using the second configuration information of the CP length, the base station may indicate, to the user equipment, frequency division multiplexing of an extended CP and a normal CP in a subframe.

Step 112: The user equipment receives a signal according to the configuration information of the cell. The signal transmitted by the base station may be a data signal or a control signal or a reference signal or the like, which is not limited herein.

If a base station indicates, to UE by using MBSFN subframe configuration signaling, which subframes may be MBSFN subframes, the subframes that may be MBSFN subframes do not necessarily transmit an MBMS service. When the UE is not sure whether an MBSFN subframe definitely transmits the MBMS service and the MBMS service is not scheduled for the UE, the UE can only blindly detect whether the MBSFN subframe uses an extended CP or a normal CP. In each MBSFN subframe, the UE may detect downlink control information (Downlink Control Information, DCI for short) of a control region. If the UE detects valid downlink scheduling information for the subframe, it is considered that any region of the subframe except the control region uses a normal CP; otherwise, it is considered that any region of the subframe except the control region uses an extended CP. Then, the UE detects a corresponding channel state information-reference signal (Channel State Information-Reference Signal, CSI-RS for short) and a channel state information interference measurement resource (Channel State Information Interference Measurement Resource, CSI-IMR for short) according to the CP length. Therefore, efficiency of detecting the CSI-RS and the CSI-IMR is affected.

However, in this embodiment, when a base station incorporates, in configuration information of a cell in configuration signaling, first configuration information of a CP length, for indicating, to user equipment, configuration information of a subframe using an extended CP, the user equipment can determine, without blindly detecting the MBSFN subframe, whether a symbol in the MBSFN subframe uses an extended CP or a normal CP, and therefore can directly detect a corresponding CSI-RS and CSI-IMR according to the configured CP length. Therefore, efficiency of determining a configuration of the cell by the UE is improved, complexity of determining the configuration of the cell by the UE is reduced, and efficiency of detecting the CSI-RS and CSI-IMR is improved.

The first configuration information of the CP length, transmitted by using a SIB 2, is used to indicate, to the user equipment, configuration information of a subframe using an extended CP, and may be used in an NCT carrier type. In the NCT carrier type, the UE can already determine, according to the carrier type, a subframe for transmitting a CRS and that the CRS is transmitted only in subframe 0/5. Therefore, definitely, no CRS is transmitted in subframes 1, 2, 3, 4, 6, 7, 8, and 9. In this case, the first configuration information of the CP length is indicated by multiplexing MBSFN subframe configuration signaling in the SIB 2, without using additional signaling, so that the UE determines a subframe using an extended CP. Therefore, an advantageous effect of saving a signaling overhead and reducing complexity of the UE may be achieved.

In an LTE system, the UE considers that a CP length used by each symbol in any region of an MBSFN subframe except a control region is the same and is the same in entire system bandwidth. When an MBMS service is transmitted in a subframe, even if a part of bandwidth is used for transmission, another part of bandwidth can only be idle and cannot be used for transmitting a non-MBMS service, or another part of bandwidth can use only an extended CP to transmit a non-MBMS service. A system capacity is limited by the extended CP, flexibility is limited, and efficiency of using radio resources is also limited. The MBMS service may be any service transmitted in the MBSFN subframe, for example, a multimedia broadcast service (Multimedia Broadcast and Multicast Service, MBMS for short) service, or a group communication (group communication) service.

However, in this embodiment, when the base station incorporates, in the configuration information of the cell in the configuration signaling, second configuration information of a CP length, for indicating, to the user equipment, configuration information of a frequency band using an extended CP and/or a frequency band using a normal CP in at least one subframe, frequency division multiplexing may be performed on an MBMS service and a non-MBMS service in a subframe, and a system capacity does not need to be limited by the extended CP. Therefore, resource utilization of a service using a normal CP is improved, flexibility of using radio resources is improved, a capacity of a subframe using an extended CP is increased, and resource utilization of a service using a normal CP is improved. Because the second configuration information of the CP length indicates, to the user equipment, the configuration information of the frequency band using the extended CP and/or the frequency band using the normal CP, efficiency of determining the configuration of the cell by the UE is improved, and complexity of implementation of the UE is reduced.

FIG. 12 is a flowchart of yet another method for receiving information according to an embodiment of the present invention. This embodiment mainly describes how to perform frequency division multiplexing on an MBMS service and a non-MBMS service in a subframe. As shown in FIG. 12, the method provided by this embodiment includes:

Step 121: User equipment receives configuration signaling sent by a base station, where the configuration signaling includes second configuration information of a CP length, and the second configuration information of the CP length is used to indicate, to the user equipment, configuration information of a frequency band using an extended CP and a frequency band using a normal CP in at least one subframe, and a location of a guard band not for transmitting a signal in a particular subframe, where the guard band is an intermediate frequency band between a frequency band using an extended CP and a frequency band using a normal CP, and the particular subframe is a subframe using both an extended CP and a normal CP.

The second configuration information of the CP length may be used to indicate, to the user equipment, at least two of configuration information of the frequency band using the extended CP, configuration information of the frequency band using the normal CP, and configuration information of the guard band. When the second configuration information of the CP length is used to transmit only two of the foregoing configuration information, on a basis of the configuration information, the UE may calculate third configuration information according to downlink transmission bandwidth.

Step 122: The user equipment receives the signal according to the second configuration information of the CP length, and does not receive the signal in the guard band in the particular subframe.

To avoid mutual interference between an MBMS service and a non-MBMS service, as shown in FIG. 6B, in this embodiment, an intermediate frequency band between a frequency band using an extended CP and a frequency band using a normal CP is disposed as a guard band not for transmitting a signal. That is, no signal is transmitted in the intermediate frequency band between the frequency band using the extended CP and the frequency band using the normal CP. Sizes of sub bandwidth using extended CPs in different subframes are independent, and may be the same, or may be different; likewise, sizes of sub bandwidth using normal CPs in different subframes are independent, and may be the same, or may be different. Sizes of guard bands in different subframes are independent. A guard band may exist only in a part of subframes or a part of symbols. Because an intermediate frequency band between a frequency band using an extended CP and a frequency band using a normal CP is used as a guard band in a particular subframe, interference between a signal using a normal CP and a signal using an extended CP may be controlled effectively, and a feasible method is provided for efficient use of radio resources.

When the location of the guard band in the particular subframe is indicated to the user equipment, the second configuration information of the CP length may indicate a start position of the guard band and a length of the guard band to the user equipment; or may indicate a start position and an end position of the guard band to the user equipment; or may indicate a center position of the guard band and a length of the guard band to the user equipment; or may notify the user equipment that all frequency bands except the frequency band using the extended CP and the frequency band using the normal CP are guard bands, which is not limited herein.

The base station may use the following signaling manner to notify the UE of locations of the extended CP, the normal CP, and/or the guard band in a frequency domain:

```
frequency-domain CP configuration information {
    location of the extended CP (which, for example, may be indicated in a manner similar to that of resource allocation)
    size of the guard band (which, for example, may be indicated in a manner similar to that of resource allocation)
    location of the normal CP (which, for example, may be indicated in a manner similar to that of resource allocation)
}
```

In this embodiment, in at least one subframe, a transmission frequency band is divided into at least two frequency sub-bands: a frequency band using an extended CP and a frequency band using a normal CP, where CPs used in different frequency sub-bands may be different. When CPs used by two adjacent frequency sub-bands are different, a guard band is added between the two frequency sub-bands, where the guard band is not used to transmit a signal.

Optionally, no guard band is disposed in a last symbol of each timeslot in a particular subframe using both an extended CP and a normal CP. As shown in FIG. 6C, no guard band exists in the last symbol of each timeslot in the particular subframe. Correspondingly, that the base station transmits information to the user equipment according to configuration information of a serving cell includes: the base station transmits the information in the particular subframe to the user equipment according to the configuration information of the serving cell, and does not transmit the signal in the intermediate frequency band between the frequency band using the extended CP and the frequency band using the normal CP in the particular subframe, where the guard band is not disposed in the last symbol of each timeslot in the particular subframe, so that the entire downlink transmission bandwidth may be used for signal transmission.

Optionally, the second configuration information of the CP length is further used to indicate, to the user equipment, location information and/or bandwidth information of guard bands in different symbols in the particular subframe. As shown in FIG. 6D, in the last symbol of each slot in the particular subframe, bandwidth of a guard band is three subcarriers, but in other symbols, bandwidth of a guard band is five subcarriers.

In this embodiment, a particular subframe uses both an extended CP and a normal CP, an MBMS service is transmitted in a frequency band of the extended CP of the particular subframe, and a non-MBMS service is transmitted in a frequency band of the normal CP of the particular subframe. Therefore, frequency division multiplexing may be performed on the MBMS service and the non-MBMS service in a particular subframe, and a system capacity does not need to be limited by the extended CP. Therefore, resource utilization of a service using a normal CP is improved, and flexibility of using radio resources is improved. Because a base station uses second configuration information of a CP length to indicate, to UE, that both the extended CP and the normal CP are used in the particular subframe, efficiency of determining a configuration of a cell by the UE is improved, and complexity of determining the configuration of the cell by the UE is reduced. Because an intermediate frequency band between a frequency band using an extended CP and a frequency band using a normal CP is used as a guard band in the particular subframe, interference between a signal using a normal CP and a signal using an extended CP may be controlled effectively, and a feasible method is provided for efficient use of radio resources.

Optionally, in this embodiment, the configuration signaling received by the user equipment may be MBSFN subframe configuration signaling. Further, when the configuration signaling received by the user equipment is the MBSFN subframe configuration signaling, configuration information of the cell in the MBSFN subframe configuration signaling may further include CRS transmission configuration information. The CRS transmission configuration information may be indicated by a particular state in states of the MBSFN subframe configuration signaling. For details, refer to descriptions in the embodiments corresponding to FIG. 9 and FIG. 10.

Optionally, in this embodiment, the configuration information of the cell in the configuration signaling sent by the base station to the user equipment may further include first configuration information of the CP length.

FIG. 13 is a flowchart of a method for receiving information according to an embodiment of the present invention. In this embodiment, signaling of configuration information of a serving cell, delivered by a base station to user equipment, is not limited to MBSFN subframe configuration signaling, and may be other configuration signaling. As shown in FIG. 13, the method provided by this embodiment includes:

Step 131: User equipment receives configuration signaling sent by a base station, where the configuration signaling includes configuration information of a cell, where the configuration information of the cell includes first configuration information of a CP length.

The first configuration information of the CP length, transmitted by using a SIB 2, is used to indicate, to the user equipment, configuration information of a subframe using an extended CP, for example, indicate, to the user equipment, that in a radio frame, subframes 0, 4, 5, and 9 use a normal CP, and that subframes 1, 2, 3, 6, 7, and 8 use an extended CP. To notify the UE, an information element in the SIB 2 may be used, for example, an MBSFN subframe configuration information element is used. MBSFN subframe pattern configuration information in an MBSFN is used to indicate a number of a subframe using an extended CP, or another information element is reused or a new information element is used to indicate a number of a subframe using an extended CP. Therefore, the UE can directly and accurately obtain whether a CP actually used by each subframe is an extended CP or a normal CP, without blindly detecting the subframe or obtaining, according to a PDCCH detection result, whether a CP actually used by each subframe is an extended CP or a normal CP.

Step 132: The user equipment receives a signal according to the configuration information of the cell.

Optionally, in the embodiment of the present invention, the configuration signaling received by the user equipment may be MBSFN subframe configuration signaling. Further, when the configuration signaling received by the user equipment is the MBSFN subframe configuration signaling, configuration information of the cell in the MBSFN subframe configuration signaling may further include CRS transmission configuration information. The CRS transmission configuration information may be indicated by a particular state in states of the MBSFN subframe configuration signaling. For details, refer to descriptions in the embodiments corresponding to FIG. 3 and FIG. 4. Therefore, when the configuration information sent by the base station to the user equipment is the MBSFN subframe configuration signaling, the base station indicates, to the user equipment by using the MBSFN subframe configuration signaling, a region for transmitting a CRS in a time domain, and may further determine whether a carrier type of the cell is an NCT carrier or a conventional carrier, without increasing additional signaling. Therefore, efficiency of determining a configuration of the cell by the UE is improved, and complexity of determining the configuration of the cell by the UE is reduced.

Optionally, in the embodiment of the present invention, the configuration information of the cell in the configuration signaling received by the user equipment may further include second configuration information of the CP length.

In this embodiment, when a base station incorporates, in configuration information of a cell in configuration signaling, first configuration information of a CP length, for indicating, to user equipment, configuration information of a subframe using an extended CP, the user equipment can determine, without blindly detecting the MBSFN subframe, whether a symbol in the MBSFN subframe uses an extended CP or a normal CP, and therefore can directly detect a corresponding CSI-RS and CSI-IMR according to the configured CP length. Therefore, efficiency of determining a configuration of the cell by the UE is improved, complexity of determining the configuration of the cell by the UE is reduced, and efficiency of detecting the CSI-RS and CSI-IMR is improved.

It should be noted that in the embodiment of the present invention, in addition to the CRS transmission configuration information, the first configuration information of the CP length and/or the second configuration information of the CP length may also be indicated by a particular state in the states of the MBSFN subframe configuration signaling. In the embodiment of the present invention, the first configuration information of the CP length or the second configuration information of the CP length is indicated by a fourth state of the MBSFN subframe configuration signaling. That is, the base station uses a particular state in the states of the MBSFN subframe configuration signaling to indicate, to the user equipment, the configuration information of the subframe using the extended CP, for example, an MBSFN subframe indicated by a state value of the MBSFN subframe configuration signaling is the subframe using the extended CP; or to indicate, to the user equipment, configuration information of a frequency band using an extended CP and/or a frequency band using a normal CP in at least one subframe, for example, an MBSFN subframe indicated by a state value of the MBSFN subframe configuration signaling is a subframe including the frequency band using the extended CP and the frequency band using the normal CP. Because the second configuration information of the CP length exists, frequency division multiplexing may be performed on an MBMS service and a non-MBMS service in a subframe, and a system capacity does not need to be limited by the extended CP. Therefore, resource utilization of a service using a normal CP is improved, flexibility of using radio resources is improved, a capacity of a subframe using an extended CP is increased, and resource utilization of a service using a normal CP is improved. Because the second configuration information of the CP length indicates, to the user equipment, the configuration information of the frequency band using the extended CP and/or the frequency band using the normal CP, efficiency of determining the configuration of the cell by the UE is improved, and complexity of implementation of the UE is reduced.

It should be noted that: in the embodiment of the present invention, the states of the MBSFN subframe configuration signaling include a first state, a second state, a third state, and a fourth state, or the states of the MBSFN subframe configuration signaling include only a third state and a first state, or the states of the MBSFN subframe configuration signaling include only a third state and a second state, or the states of the MBSFN subframe configuration signaling include only a first state, a second state, and a third state, or the states of the MBSFN subframe configuration signaling include only a third state, a first state, and a fourth state, or the states of the MBSFN subframe configuration signaling include only a third state, a second state, and a fourth state. Therefore, a particular state of the MBSFN subframe configuration signaling is the third state, and/or, the particular state is the first state, and/or, the particular state is the second state, and/or, the particular state is the fourth state. The base station may use the states of the MBSFN subframe configuration signaling in combination. For example, combination manner 1: the base station uses only the third state and the first state; combination manner 2: the base station uses only the third state and the second state; combination manner 3: the base station uses the first state, the second state, and the third state in combination; combination manner 4: the base station uses the third state, the first state, and the fourth state in combination; combination manner 5: the base station uses the third state, the second state, and the fourth state in combination. All states in the embodiment of the present invention may be all states of MBSFN signaling, or particular states of MBSFN signaling. When all the states are particular states, meanings of some states may be the same as meanings of existing states. Optionally, a state of the MBSFN subframe configuration signaling may also belong to the fourth state when belonging to the first state or the second state or the third state.

Figure 14:
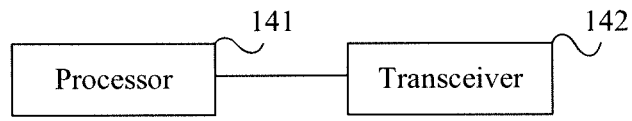
FIG. 14 is a schematic structural diagram of a base station according to an embodiment of the present invention.

FIG. 14 is a schematic structural diagram of a base station according to an embodiment of the present invention. As shown in FIG. 14, the base station provided by this embodiment includes a processor 141 and a transceiver 142.

The processor 141 is configured to determine multicast-broadcast single-frequency network MBSFN subframe configuration signaling according to a configuration of a cell, where the MBSFN subframe configuration signaling includes cell-specific reference signal CRS transmission configuration information, where the CRS transmission configuration information is used to indicate, to user equipment, a region for transmitting the CRS in a time domain.

The region for transmitting the CRS in the time domain includes a subframe for transmitting the CRS and the region for transmitting the CRS in the subframe, where the region for transmitting the CRS may be a part of symbols in a subframe, for example, a non-MBSFN region of an MBSFN subframe.

The transceiver 142 is configured to send the MBSFN subframe configuration signaling to the user equipment.

The transceiver 142 is further configured to transmit a signal according to the CRS transmission configuration information.

The MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

In a piece of MBSFN subframe configuration signaling, a state of the MBSFN subframe configuration signaling is used to provide an indication for the UE.

For example, the N bits of the MBSFN subframe configuration signaling carry the following parameters: MBSFN subframe configuration (MBSFN subframe configuration), radio frame allocation period (radio frame allocation period), radio frame allocation offset (radio frame Allocation Offset), and subframe allocation (subframe Allocation). The subframe allocation is one of a one-radio-frame (one Frame) allocation manner and a four-radio-frame (four Frames) allocation manner. Particular states in the states of the MBSFN subframe configuration signaling are indicated by values of the foregoing parameters in the MBSFN subframe configuration signaling. Optionally, the states of the MBSFN subframe configuration signaling include but are not limited to a state in which a radio frame includes a maximum of six MBSFN subframes.

A type of the MBSFN subframe configuration is sequence (SEQUENCE). The radio frame allocation period is a parameter of an enumeration type, and its value is one of {n1, n2, n4, n8, n16, n32}, where n1/m2/n4/n8/n16/n32 represents that the radio frame period is 1/2/4/8/16/32 radio frames. A type of the radio frame allocation offset is integer (INTEGER), and a value range is INTEGER (0-7), namely, integers from 0 to 7, where 0//1/2/3/4/5/6/7 represents that the offset is 0//1/2/3/4/5/6/7 radio frames. A type of the subframe allocation is choice (CHOICE), and a value of the subframe allocation is either the one-radio-frame allocation manner or the four-radio-frame allocation manner. A type of the one-radio-frame allocation manner is bit string (BIT STRING), and a length thereof is SIZE(6), where bit 0/1/2/3/4/5 represents whether subframe 1/2/3/6/7/8 is an MBSFN subframe, where 1 represents an MBSFN subframe and 0 represents a non-MBSFN subframe. A type of the four-radio-frame allocation manner is BIT STRING, and a length thereof is SIZE(24), where bits 0-5, 6-11, 12-17, and 18-23 respectively represent MBSFN subframe configurations in radio frames 0, 1, 2, and 3 in the radio frame period.

In the technical solution provided by this embodiment, a base station uses MBSFN subframe configuration signaling to send CRS transmission configuration information to user equipment to indicate a region for transmitting a CRS in a time domain, and does not use additional signaling to notify the user equipment of the region for transmitting the CRS; without recognizing additional signaling, the user equipment can determine the region for transmitting the CRS, and further determine a configuration of a cell. Therefore, efficiency of determining the configuration of the cell by the user equipment is improved, complexity of determining the configuration of the cell by the UE is reduced, a signaling overhead is saved, and system compatibility is improved.

Optionally, in the foregoing embodiment, the transceiver is further configured to transmit the CRS in a first-type subframe of the cell, and skip transmitting the CRS in a second-type subframe of the cell; and a particular state in the states of the MBSFN subframe configuration signaling is used to indicate, to the user equipment, that the CRS is transmitted in the first-type subframe of the cell, and indicate, to the user equipment, that the CRS is not transmitted in the second-type subframe of the cell, where the first-type subframe and the second-type subframe are predefined or configured by the base station for the user equipment.

In the particular states in the states of the MBSFN subframe configuration signaling, the particular state in the states of the MBSFN subframe configuration signaling that indicates, to the user equipment, that the CRS is transmitted in the first-type subframe of the cell, and indicates, to the user equipment, that the CRS is not transmitted in the second-type subframe of the cell, may be referred to as a first state of the MBSFN subframe configuration signaling.

When the MBSFN subframe configuration signaling is in the first state, a reduced CRS (Reduced CRS, RCRS for short) or a tracking reference signal (Tracking Reference Signal, TRS for short) is transmitted or a CRS with one antenna port is transmitted only in subframe 0 and subframe 5 in a radio frame, and the CRS is not transmitted in other subframes. Therefore, the first-type subframe includes subframes 0 and 5, and the second-type subframe includes any subframe except subframes 0 and 5. A quantity of CRS ports in the subframe for transmitting the CRS may be equal to 1. Optionally, the quantity of CRS ports in the subframe for transmitting the CRS may also be equal to 2 or 4.

The first state of the MBSFN subframe configuration signaling may be further used to indicate, to user equipment, and in particular, to user equipment that recognizes an NCT, that a corresponding serving cell of a corresponding carrier does not provide a service for conventional user equipment. The conventional user equipment may be user equipment that does not support the NCT.

The first state of the MBSFN subframe configuration signaling may have the following usage: an MBSFN subframe indicated by the MBSFN subframe configuration signaling is the second-type subframe, and a non-MBSFN subframe is the first-type subframe. Optionally, all states corresponding to the first state are NCT carrier states, that is, the CRS or RCRS is transmitted only in subframe 0 and subframe 5, and the CRS is not transmitted in other subframes. The RCRS is a CRS with only one port.

For example, the first state of the MBSFN subframe configuration signaling may be configured in the following manner: the first state may be one of all states except the following states: (1) a third state, and (2) a state in which the radio frame allocation period is one radio frame and the radio frame allocation offset is not zero. The first state may also be used to indicate a configuration of an MBSFN subframe to the UE. For the third state of the MBSFN subframe configuration signaling, refer to the following description.

Optionally, in the foregoing embodiment, the transceiver is further configured to transmit the CRS in a non-MBSFN subframe of the cell and in a non-MBSFN region of an MBSFN subframe of the cell, and a particular state in the states of the MBSFN subframe configuration signaling is used to indicate, to the user equipment, that the CRS is transmitted in the non-MBSFN subframe of the cell and in the non-MBSFN region of the MBSFN subframe of the cell. Further, when a radio frame of the cell includes at least seven MBSFN subframes, the particular state in the states of the MBSFN subframe configuration signaling is indicated by a state value of the MBSFN subframe configuration signaling in which the radio frame allocation period is one radio frame and the radio frame allocation offset is not zero.

In the particular states in the states of the MBSFN subframe configuration signaling, the state that indicates, to the user equipment, that the CRS is transmitted in the non-MBSFN subframe of the cell and in the non-MBSFN region of the MBSFN subframe of the cell, may be referred to as a second state of the MBSFN subframe configuration signaling. When the MBSFN subframe configuration signaling is in the second state, a radio frame of the cell includes at least seven MBSFN subframes, and the particular state in the states of the MBSFN subframe configuration signaling is indicated by a state of the MBSFN subframe configuration signaling in which the radio frame allocation period is one radio frame and the radio frame allocation offset is not zero.

The second state of the MBSFN subframe configuration signaling may be described by using a reserved or unused state of an MBSFN subframe configuration, for example, indicated by a state value of the MBSFN subframe configuration signaling in which the radio frame allocation period is one radio frame, the radio frame allocation offset is not zero, the subframe allocation is the one-radio-frame allocation manner and the six bits of the one-radio-frame allocation manner are all configured as 1. For example, the second state is indicated by a state value of the MBSFN subframe configuration signaling in which the radio frame allocation period is four radio frames, the radio frame allocation offset is greater than or equal to 4, the subframe allocation is the four-radio-frame allocation manner, and the 24 bits of the four-radio-frame allocation manner are all configured as 1. For another example, the second state of the MBSFN subframe configuration signaling may be further indicated by a state value of the MBSFN subframe configuration signaling in which the radio frame allocation period is one radio frame, the radio frame allocation offset is not zero, the subframe allocation is the one-radio-frame allocation manner, and the six bits of the one-radio-frame allocation manner are configured as other values. Optionally, a part of subframes may be predefined as MBSFN subframes, and six bits of the subframe allocation may be used to configure configuration information about whether other subframes are used as MBSFN subframes. For example, subframes 2, 3, 4, 6, 7, and 8 are predefined as MBSFN subframes, and the six bits of the one-radio-frame allocation manner are used to indicate whether subframes 0, 1, 5, and 9 are MBSFN subframes. In addition, the subframe allocation may be further configured according to the four-radio-frame allocation manner. For example, a particular state in the 24 bits of the four-radio-frame allocation manner is used to indicate that more than six MBSFN subframes are included in at least one radio frame in four radio frames, and further, an additional information element may be used for description.

There are eight radio frame allocation offsets offset in total in the MBSFN subframe configuration signaling, where one non-zero radio frame allocation offset offset indentifies N MBSFN subframes and patterns of the subframes. In a radio frame, when a quantity of MBSFN subframes is 7-10, there may be multiple different patterns, where the most important pattern of 7 MBSFN subframes includes 1, 2, 3, 4, 6, 7, and 8, or 1, 2, 3, 6, 7, 8, and 9; the most important pattern of 8 MBSFN subframes is 1, 2, 3, 4, 6, 7, 8, and 9; the most important pattern of 9 MBSFN subframes is 0, 1, 2, 3, 4, 6, 7, 8, and 9, or 1, 2, 3, 4, 5, 6, 7, 8, and 9; and the most important pattern of 10 MBSFN subframes is 0-9. The foregoing several MBSFN subframe configurations may be indicated by using a state in which the radio frame allocation period is one and the radio frame allocation offset offset is N, where $0<N<=7$.

For the third state of the MBSFN subframe configuration signaling, in the particular states in the states of the MBSFN subframe configuration signaling, a particular state in the states of the MBSFN subframe configuration signaling that indicates, to the user equipment, that a radio frame includes a maximum of six MBSFN subframes and that the CRS is transmitted in the non-MBSFN subframe of the cell and in the non-MBSFN region of the MBSFN subframe of the cell may be referred to as the third state of the MBSFN subframe configuration signaling. When the MBSFN subframe configuration signaling is in the third state, the cell may transmit a service for conventional UE. Optionally, the quantity of CRS ports is 1; or optionally, the quantity of CRS ports is a quantity of CRS ports that is obtained by using a physical broadcast channel (Physical Broadcast Channel, PBCH for short). For example, the third state of the MBSFN subframe configuration signaling may be configured in the following manner: the radio frame allocation period is one radio frame, the radio frame allocation offset is 0, the subframe allocation is configured according to the one-radio-frame allocation manner, and the six bits of the one-radio-frame allocation manner are all configured as 1; or the radio frame allocation period is one radio frame, the radio frame allocation offset is 0, the subframe allocation is configured according to the four-radio-frame allocation manner, and the 24 bits of the four-radio-frame allocation manner are configured as 1. The conventional user equipment may be user equipment that does not support the NCT. In this case, the NCT carrier may be used as a secondary carrier of the conventional user equipment, but the conventional user equipment receives a broadcast channel, a physical downlink control channel (Physical Downlink Control Channel, PDCCH for short), or the like from a primary carrier (non-NCT carrier) of the conventional user equipment. Therefore, a manner is provided: when the conventional user equipment needs to be served, a system parameter corresponding to the third state is configured for the NCT carrier; and when the conventional user equipment does not need to be served, a system parameter corresponding to the NCT carrier is configured, so that the NCT carrier can be used more flexibly and provide a service for the conventional user equipment.

Figure 15:
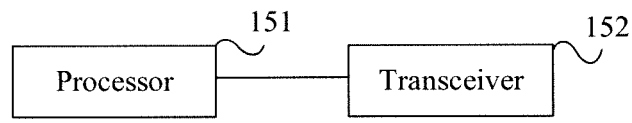
FIG. 15 is a schematic structural diagram of another base station according to an embodiment of the present invention.

FIG. 15 is a schematic structural diagram of another base station according to an embodiment of the present invention. As shown in FIG. 15, the base station provided by this embodiment includes a processor 151 and a transceiver 152.

The processor 151 is configured to determine configuration signaling according to a configuration of a cell, where the configuration signaling includes configuration information of the cell, where the configuration information of the cell includes at least one of the following information: first configuration information of a cyclic prefix CP length or second configuration information of a CP length.

The first configuration information of the CP length is transmitted by using a system information block type 2 (System Information Block Type2, SIB 2 for short) and used to indicate, to user equipment, configuration information of a subframe using an extended CP. The first configuration information of the CP length is used to indicate, to the user equipment, configuration information of a subframe using an extended CP, for example, indicate, to the user equipment, that in a radio frame, subframes 0, 4, 5, and 9 use a normal CP, and that subframes 1, 2, 3, 6, 7, and 8 use an extended CP. Therefore, the UE can directly and accurately obtain whether a CP actually used by each subframe is an extended CP or a normal CP, without blindly detecting the subframe or obtaining, according to a PDCCH detection result, whether a CP actually used by each subframe is an extended CP or a normal CP. For another example, the first configuration information of the CP length indicates, to the user equipment, that in a radio frame, subframes 0, 4, 5, and 9 use a normal CP, and that subframes 1, 2, 3, 6, 7, and 8 use an extended CP. To notify the UE, an information element in the SIB 2 may be used, for example, an MBSFN subframe configuration information element is used. MBSFN subframe pattern configuration information in an MBSFN is used to indicate a number of a subframe using an extended CP, or another information element is reused or a new information element is used to indicate a number of a subframe using an extended CP. Therefore, the UE can directly and accurately obtain whether a CP actually used by each subframe is an extended CP or a normal CP, without blindly detecting the subframe or obtaining, according to a PDCCH detection result, whether a CP actually used by each subframe is an extended CP or a normal CP.

The second configuration information of the CP length is used to indicate, to the user equipment, configuration information of a frequency band using an extended CP and/or a frequency band using a normal CP in at least one subframe. By using the second configuration information of the CP length, the base station may indicate, to the user equipment, frequency division multiplexing of an extended CP and a normal CP in a subframe.

The transceiver 152 is configured to send the configuration signaling to the user equipment.

The transceiver 152 is further configured to transmit a signal according to the configuration information of the cell.

In this embodiment, when a base station incorporates, in configuration information of a cell in configuration signaling, first configuration information of a CP length, for indicating, to user equipment, configuration information of a subframe using an extended CP, the user equipment can determine, without blindly detecting the MBSFN subframe, whether a symbol in the MBSFN subframe uses an extended CP or a normal CP, and therefore can directly detect a corresponding CSI-RS and CSI-IMR according to the configured CP length. Therefore, efficiency of determining a configuration of the cell by the UE is improved, complexity of determining the configuration of the cell by the UE is reduced, and efficiency of detecting the CSI-RS and CSI-IMR is improved.

In this embodiment, when the base station incorporates, in the configuration information of the cell in the configuration signaling, second configuration information of a CP length, for indicating, to the user equipment, configuration information of a frequency band using an extended CP and/or a frequency band using a normal CP in at least one subframe, frequency division multiplexing may be performed on an MBMS service and a non-MBMS service in a subframe, and a system capacity does not need to be limited by the extended CP. Therefore, resource utilization of a service using a normal CP is improved, flexibility of using radio resources is improved, a capacity of a subframe using an extended CP is increased, and resource utilization of a service using a normal CP is improved. Because the second configuration information of the CP length indicates, to the user equipment, the configuration information of the frequency band using the extended CP and/or the frequency band using the normal CP, efficiency of determining the configuration of the cell by the UE is improved, and complexity of implementation of the UE is reduced.

Optionally, on a basis of the foregoing embodiment, to avoid mutual interference between an MBMS service and a non-MBMS service, as shown in FIG. 6B, in this embodiment, an intermediate frequency band between a frequency band using an extended CP and a frequency band using a normal CP is disposed as a guard band not for transmitting a signal. That is, no signal is transmitted in the intermediate frequency band between the frequency band using the extended CP and the frequency band using the normal CP. Sizes of sub bandwidth using extended CPs in different subframes are independent, and may be the same, or may be different; likewise, sizes of sub bandwidth using normal CPs in different subframes are independent, and may be the same, or may be different. Sizes of guard bands in different subframes are independent. A guard band may exist only in a part of subframes or a part of symbols. Because an intermediate frequency band between a frequency band using an extended CP and a frequency band using a normal CP is used as a guard band in a particular subframe, interference between a signal using a normal CP and a signal using an extended CP may be controlled effectively, and a feasible method is provided for efficient use of radio resources.

The transceiver is further configured to transmit the signal according to the second configuration information of the CP length and skip transmitting the signal in the guard band in the particular subframe, where the second configuration information of the CP length is further used to indicate, to the user equipment, a location of the guard band not for transmitting the signal in the particular subframe, where the guard band is an intermediate frequency band between a frequency band using an extended CP and a frequency band using a normal CP, and the particular subframe is a subframe using both an extended CP and a normal CP.

Further, the transceiver is further configured to transmit the signal in a last symbol of each timeslot in the particular subframe, where the guard band is not disposed in the last symbol of each timeslot in the particular subframe. As shown in FIG. 6C, no guard band exists in the last symbol of each timeslot in the particular subframe.

Still further, the second configuration information of the CP length is further used to indicate, to the user equipment, location information and/or bandwidth information of guard bands in different symbols in the particular subframe. As shown in FIG. 6D, in the last symbol of each slot in the particular subframe, bandwidth of a guard band is three subcarriers, but in other symbols, bandwidth of a guard band is five subcarriers.

When the location of the guard band in the particular subframe is indicated to the user equipment, the second configuration information of the CP length may indicate a start position of the guard band and a length of the guard band to the user equipment; or may indicate a start position and an end position of the guard band to the user equipment; or may indicate a center position of the guard band and a length of the guard band to the user equipment; or may notify the user equipment that all frequency bands except the frequency band using the extended CP and the frequency band using the normal CP are guard bands, which is not limited herein.

In this embodiment, in at least one subframe, a transmission frequency band is divided into at least two frequency sub-bands: a frequency band using an extended CP and a frequency band using a normal CP, where CPs used in different frequency sub-bands may be different. When CPs used by two adjacent frequency sub-bands are different, a guard band is added between the two frequency sub-bands, where the guard band is not used to transmit a signal.

Optionally, on a basis of the foregoing embodiment, the configuration signaling is multicast-broadcast single-frequency network MBSFN subframe configuration signaling. Further, when the configuration signaling is the multicast-broadcast single-frequency network MBSFN subframe configuration signaling, the configuration information of the cell further includes cell-specific reference signal CRS transmission configuration information, where the CRS transmission configuration information is used to indicate, to the user equipment, a region for transmitting a CRS in a time domain. The CRS transmission configuration information may be indicated by a particular state in states of the MBSFN subframe configuration signaling.

Figure 16:
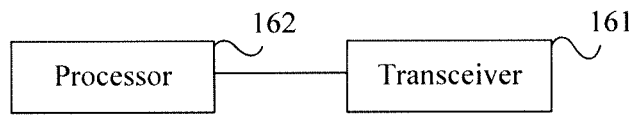
FIG. 16 is a schematic structural diagram of user equipment according to an embodiment of the present invention.

FIG. 16 is a schematic structural diagram of user equipment according to an embodiment of the present invention. As shown in FIG. 16, the equipment provided by this embodiment includes a transceiver 161 and a processor 162.

The transceiver 161 is configured to receive multicast-broadcast single-frequency network MBSFN subframe configuration signaling sent by a base station, where the MBSFN subframe configuration signaling includes cell-specific reference signal CRS transmission configuration information, where the CRS transmission configuration information is used to indicate, to the user equipment, a region for transmitting a CRS in a time domain.

The processor 162 is configured to parse the MBSFN subframe configuration signaling.

The transceiver 161 is further configured to receive a signal according to the CRS transmission configuration information.

The region for transmitting the CRS in the time domain includes a subframe for transmitting the CRS and the region for transmitting the CRS in the subframe, where the region for transmitting the CRS may be a part of symbols in a subframe, for example, a non-MBSFN region of an MBSFN subframe.

The MBSFN subframe configuration signaling includes n bits, where the n bits are used to indicate states of the MBSFN subframe configuration signaling, and n is a positive integer; and a particular state in the states of the MBSFN subframe configuration signaling is used to indicate the CRS transmission configuration information.

In a piece of MBSFN subframe configuration signaling, a state of the MBSFN subframe configuration signaling is used to provide an indication for the UE.

For example, the N bits of the MBSFN subframe configuration signaling carry the following parameters: MBSFN subframe configuration (MBSFN subframe configuration), radio frame allocation period (radio frame allocation period), radio frame allocation offset (radio frame Allocation Offset), and subframe allocation (subframe Allocation). The subframe allocation is one of a one-radio-frame (one Frame) allocation manner and a four-radio-frame (four Frames) allocation manner. Particular states in the states of the MBSFN subframe configuration signaling are indicated by values of the foregoing parameters in the MBSFN subframe configuration signaling. Optionally, the states of the MBSFN subframe configuration signaling include but are not limited to a state in which a radio frame includes a maximum of six MBSFN subframes.

A type of the MBSFN subframe configuration is sequence (SEQUENCE). The radio frame allocation period is a parameter of an enumeration type, and its value is one of {n1, n2, n4, n8, n16, n32}, where n1/m2/n4/n8/n16/n32 represents that the radio frame period is 1/2/4/8/16/32 radio frames. A type of the radio frame allocation offset is integer (INTEGER), and a value range is INTEGER (0-7), namely, integers from 0 to 7, where 0//1/2/3/4/5/6/7 represents that the offset is 0//1/2/3/4/5/6/7 radio frames. A type of the subframe allocation is choice (CHOICE), and a value of the subframe allocation is either the one-radio-frame allocation manner or the four-radio-frame allocation manner. A type of the one-radio-frame allocation manner is bit string (BIT STRING), and a length thereof is SIZE(6), where bit 0/1/2/3/4/5 represents whether subframe 1/2/3/6/7/8 is an MBSFN subframe, where 1 represents an MBSFN subframe and 0 represents a non-MBSFN subframe. A type of the four-radio-frame allocation manner is BIT STRING, and a length thereof is SIZE(24), where bits 0-5, 6-11, 12-17, and 18-23 respectively represent MBSFN subframe configurations in radio frames 0, 1, 2, and 3 in the radio frame period.

In the technical solution provided by this embodiment, a base station uses MBSFN subframe configuration signaling to send CRS transmission configuration information to user equipment to indicate a region for transmitting a CRS in a time domain, and does not use additional signaling to notify the user equipment of the region for transmitting the CRS; without recognizing additional signaling, the user equipment can determine the region for transmitting the CRS, and further determine a configuration of a cell. Therefore, efficiency of determining the configuration of the cell by the user equipment is improved, complexity of determining the configuration of the cell by the UE is reduced, a signaling overhead is saved, and system compatibility is improved.

Optionally, on a basis of the foregoing embodiment, the transceiver is further configured to receive the CRS in a first-type subframe of the cell, and skip receiving the CRS in a second-type subframe of the cell; and a particular state in the states of the MBSFN subframe configuration signaling is used to indicate, to the user equipment, that the CRS is transmitted in the first-type subframe of the cell, and indicate, to the user equipment, that the CRS is not transmitted in the second-type subframe of the cell, where the first-type subframe and the second-type subframe are predefined or configured by the base station for the user equipment.

In the particular states in the states of the MBSFN subframe configuration signaling, the state of the MBSFN subframe configuration signaling that indicates, to the user equipment, that the CRS is transmitted in the first-type subframe of the cell, and indicates, to the user equipment, that the CRS is not transmitted in the second-type subframe of the cell, may be referred to as a first state of the MBSFN subframe configuration signaling.

When the MBSFN subframe configuration signaling is in the first state, a reduced CRS (Reduced CRS, RCRS for short) or a tracking reference signal (Tracking Reference Signal, TRS for short) is transmitted or a CRS with one antenna port is transmitted only in subframe 0 and subframe 5 in a radio frame, and the CRS is not transmitted in other subframes. Therefore, the first-type subframe includes subframes 0 and 5, and the second-type subframe includes any subframe except subframes 0 and 5. A quantity of CRS ports in the subframe for transmitting the CRS may be equal to 1. Optionally, the quantity of CRS ports in the subframe for transmitting the CRS may also be equal to 2 or 4.

The first state of the MBSFN subframe configuration signaling may be further used to indicate, to user equipment, and in particular, to user equipment that recognizes an NCT, that a corresponding serving cell of a corresponding carrier does not provide a service for conventional user equipment. The conventional user equipment may be user equipment that does not support the NCT.

The first state of the MBSFN subframe configuration signaling may have the following usage: an MBSFN subframe indicated by the MBSFN subframe configuration signaling is the second-type subframe, and a non-MBSFN subframe is the first-type subframe. Optionally, all states corresponding to the first state are NCT carrier states, that is, the CRS or RCRS is transmitted only in subframe 0 and subframe 5, and the CRS is not transmitted in other subframes. The RCRS is a CRS with only one port.

For example, the first state of the MBSFN subframe configuration signaling may be configured in the following manner: the first state may be one of all states except the following states: (1) a third state, and (2) a state in which the radio frame allocation period is one radio frame and the radio frame allocation offset is not zero. The first state may also be used to indicate a configuration of an MBSFN subframe to the UE. For the third state of the MBSFN subframe configuration signaling, refer to the following description.

In this embodiment, MBSFN subframe configuration signaling is used to indicate, to user equipment, a region for transmitting a CRS in a time domain, so that whether a carrier type of a cell is an NCT carrier or a conventional carrier can be further determined, without increasing additional signaling. Therefore, efficiency of determining a configuration of the cell by the UE is improved, and complexity of determining the configuration of the cell by the UE is reduced.

Optionally, on a basis of the foregoing embodiment, the transceiver is further configured to receive the CRS in a non-MBSFN subframe of the cell and in a non-MBSFN region of an MBSFN subframe of the cell; and a particular state in the states of the MBSFN subframe configuration signaling is used to indicate, to the user equipment, that the CRS is transmitted in the non-MBSFN subframe of the cell and in the non-MBSFN region of the MBSFN subframe of the cell. When a radio frame of the cell includes at least seven MBSFN subframes, the particular state in the states of the MBSFN subframe configuration signaling is indicated by a state of the MBSFN subframe configuration signaling in which the radio frame allocation period is one radio frame and the radio frame allocation offset is not zero.

In the particular states in the states of the MBSFN subframe configuration signaling, the state that indicates, to the user equipment, that the CRS is transmitted in the non-MBSFN subframe of the cell and in the non-MBSFN region of the MBSFN subframe of the cell, may be referred to as a second state of the MBSFN subframe configuration signaling. When the MBSFN subframe configuration signaling is in the second state, a radio frame of the cell includes at least seven MBSFN subframes, and the particular state in the states of the MBSFN subframe configuration signaling is indicated by a state value of the MBSFN subframe configuration signaling in which the radio frame allocation period is one radio frame and the radio frame allocation offset is not zero.

The second state of the MBSFN subframe configuration signaling may be described by using a reserved or unused state of an MBSFN subframe configuration, for example, indicated by a state value of the MBSFN subframe configuration signaling in which the radio frame allocation period is one radio frame, the radio frame allocation offset is not zero, the subframe allocation is the one-radio-frame allocation manner and the six bits of the one-radio-frame allocation manner are all configured as 1. For example, the second state is indicated by a state value of the MBSFN subframe configuration signaling in which the radio frame allocation period is four radio frames, the radio frame allocation offset is greater than or equal to 4, the subframe allocation is the four-radio-frame allocation manner, and the 24 bits of the four-radio-frame allocation manner are all configured as 1. For another example, the second state of the MBSFN subframe configuration signaling may be further indicated by a state value of the MBSFN subframe configuration signaling in which the radio frame allocation period is one radio frame, the radio frame allocation offset is not zero, the subframe allocation is the one-radio-frame allocation manner, and the six bits of the one-radio-frame allocation manner are configured as other values. Optionally, a part of subframes may be predefined as MBSFN subframes, and six bits of the subframe allocation may be used to configure configuration information about whether other subframes are used as MBSFN subframes. For example, subframes 2, 3, 4, 6, 7, and 8 are predefined as MBSFN subframes, and the six bits of the one-radio-frame allocation manner are used to indicate whether subframes 0, 1, 5, and 9 are MBSFN subframes. In addition, the subframe allocation may be further configured according to the four-radio-frame allocation manner. For example, a particular state in the 24 bits of the four-radio-frame allocation manner is used to indicate that more than six MBSFN subframes are included in at least one radio frame in four radio frames, and further, an additional information element may be used for description.

There are eight radio frame allocation offsets offset in total in the MBSFN subframe configuration signaling, where one non-zero radio frame allocation offset offset indentifies N MBSFN subframes and patterns of the subframes. In a radio frame, when a quantity of MBSFN subframes is 7-10, there may be multiple different patterns, where the most important pattern of 7 MBSFN subframes includes 1, 2, 3, 4, 6, 7, and 8, or 1, 2, 3, 6, 7, 8, and 9; the most important pattern of 8 MBSFN subframes is 1, 2, 3, 4, 6, 7, 8, and 9; the most important pattern of 9 MBSFN subframes is 0, 1, 2, 3, 4, 6, 7, 8, and 9, or 1, 2, 3, 4, 5, 6, 7, 8, and 9; and the most important pattern of 10 MBSFN subframes is 0-9. The foregoing several MBSFN subframe configurations may be indicated by using a state in which the radio frame allocation period is one and the radio frame allocation offset offset is N, where 0<N<=7.

In this embodiment, MBSFN subframe configuration signaling is used to indicate, to user equipment, a region for transmitting a CRS, and therefore, may indicate whether a state of a carrier is an NCT carrier or a conventional carrier, without increasing additional signaling. Therefore, efficiency of determining a configuration of a cell by the UE is improved, and complexity of determining the configuration of the cell by the UE is reduced. In addition, in this embodiment, the MBSFN subframe configuration signaling is further used to instruct the user equipment to increase a quantity of MBSFN subframes, which increases a service transmission rate in the MBSFN subframes.

For the third state of the MBSFN subframe configuration signaling, in the particular states in the states of the MBSFN subframe configuration signaling, a particular state in the states of the MBSFN subframe configuration signaling that indicates, to the user equipment, that a radio frame includes a maximum of six MBSFN subframes and that the CRS is transmitted in the non-MBSFN subframe of the cell and in the non-MBSFN region of the MBSFN subframe of the cell may be referred to as the third state of the MBSFN subframe configuration signaling. When the MBSFN subframe configuration signaling is in the third state, the cell may transmit a service for conventional UE. Optionally, the quantity of CRS ports is 1; or optionally, the quantity of CRS ports is a quantity of CRS ports that is obtained by using a physical broadcast channel (Physical Broadcast Channel, PBCH for short). For example, the third state of the MBSFN subframe configuration signaling may be configured in the following manner: the radio frame allocation period is one radio frame, the radio frame allocation offset is 0, the subframe allocation is configured according to the one-radio-frame allocation manner, and the six bits of the one-radio-frame allocation manner are all configured as 1; or the radio frame allocation period is one radio frame, the radio frame allocation offset is 0, the subframe allocation is configured according to the four-radio-frame allocation manner, and the 24 bits of the four-radio-frame allocation manner are configured as 1. The conventional user equipment may be user equipment that does not support the NCT. In this case, the NCT carrier may be used as a secondary carrier of the conventional user equipment, but the conventional user equipment receives a broadcast channel, a physical downlink control channel (Physical Downlink Control Channel, PDCCH for short), or the like from a primary carrier (non-NCT carrier) of the conventional user equipment. Therefore, a manner is provided: when the conventional user equipment needs to be served, a system parameter corresponding to the third state is configured for the NCT carrier; and when the conventional user equipment does not need to be served, a system parameter corresponding to the NCT carrier is configured, so that the NCT carrier can be used more flexibly and provide a service for the conventional user equipment.

Figure 17:
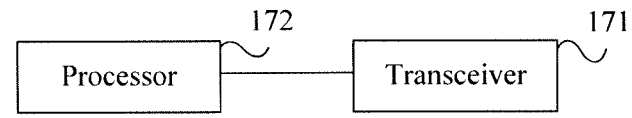
FIG. 17 is a schematic structural diagram of another user equipment according to an embodiment of the present invention.

FIG. 17 is a schematic structural diagram of user equipment according to an embodiment of the present invention. As shown in FIG. 17, the equipment provided by this embodiment includes a transceiver 171 and a processor 172.

The transceiver 171 is configured to receive configuration signaling sent by a base station, where the configuration signaling includes configuration information of a cell, where the configuration information of the cell includes at least one of the following information: first configuration information of a cyclic prefix CP length or second configuration information of a CP length.

The first configuration information of the CP length is transmitted by using a system information block type 2 and used to indicate, to the user equipment, configuration information of a subframe using an extended CP, for example, indicate, to the user equipment, that in a radio frame, subframes 0, 4, 5, and 9 use a normal CP, and that subframes 1, 2, 3, 6, 7, and 8 use an extended CP. Therefore, the UE can directly and accurately obtain whether a CP actually used by each subframe is an extended CP or a normal CP, without blindly detecting the subframe or obtaining, according to a PDCCH detection result, whether a CP actually used by each subframe is an extended CP or a normal CP. For another example, the first configuration information of the CP length indicates, to the user equipment, that in a radio frame, subframes 0, 4, 5, and 9 use a normal CP, and that subframes 1, 2, 3, 6, 7, and 8 use an extended CP. To notify the UE, an information element in the SIB 2 may be used, for example, an MBSFN subframe configuration information element is used. MBSFN subframe pattern configuration information in an MBSFN is used to indicate a number of a subframe using an extended CP, or another information element is reused or a new information element is used to indicate a number of a subframe using an extended CP. Therefore, the UE can directly and accurately obtain whether a CP actually used by each subframe is an extended CP or a normal CP, without blindly detecting the subframe or obtaining, according to a PDCCH detection result, whether a CP actually used by each subframe is an extended CP or a normal CP.

The second configuration information of the CP length is used to indicate, to the user equipment, configuration information of a frequency band using an extended CP and/or a frequency band using a normal CP in at least one subframe.

The processor 172 is configured to parse the configuration signaling.

The transceiver 171 is further configured to receive a signal according to the configuration information of the cell.

In this embodiment, when a base station incorporates, in configuration information of a cell in configuration signaling, first configuration information of a CP length, for indicating, to user equipment, configuration information of a subframe using an extended CP, the user equipment can determine, without blindly detecting the MBSFN subframe, whether a symbol in the MBSFN subframe uses an extended CP or a normal CP, and therefore can directly detect a corresponding CSI-RS and CSI-IMR according to the configured CP length. Therefore, efficiency of determining a configuration of the cell by the UE is improved, complexity of determining the configuration of the cell by the UE is reduced, and efficiency of detecting the CSI-RS and CSI-IMR is improved.

The first configuration information of the CP length, transmitted by using a SIB 2, is used to indicate, to the user equipment, configuration information of a subframe using an extended CP, and may be used in an NCT carrier type. In the NCT carrier type, the UE can already determine, according to the carrier type, a subframe for transmitting a CRS and that the CRS is transmitted only in subframe 0/5. Therefore, definitely, no CRS is transmitted in subframes 1, 2, 3, 4, 6, 7, 8, and 9. In this case, the first configuration information of the CP length is indicated by multiplexing MBSFN subframe configuration signaling in the SIB 2, without using additional signaling, so that the UE determines a subframe using an extended CP. Therefore, an advantageous effect of saving a signaling overhead and reducing complexity of the UE may be achieved.

The second configuration information of the CP length may be used to indicate, to the user equipment, at least two of configuration information of the frequency band using the extended CP, configuration information of the frequency band using the normal CP, and configuration information of a guard band. When the second configuration information of the CP length is used to transmit only two of the foregoing configuration information, on a basis of the configuration information, the UE may calculate third configuration information according to downlink transmission bandwidth.

In this embodiment, when the base station incorporates, in the configuration information of the cell in the configuration signaling, second configuration information of a CP length, for indicating, to the user equipment, configuration information of a frequency band using an extended CP and/or a frequency band using a normal CP in at least one subframe, frequency division multiplexing may be performed on an MBMS service and a non-MBMS service in a subframe, and a system capacity does not need to be limited by the extended CP. Therefore, resource utilization of a service using a normal CP is improved, flexibility of using radio resources is improved, a capacity of a subframe using an extended CP is increased, and resource utilization of a service using a normal CP is improved. Because the second configuration information of the CP length indicates, to the user equipment, the configuration information of the frequency band using the extended CP and/or the frequency band using the normal CP, efficiency of determining the configuration of the cell by the UE is improved, and complexity of implementation of the UE is reduced.

Optionally, on a basis of the foregoing embodiment, to avoid mutual interference between an MBMS service and a non-MBMS service, as shown in FIG. 6B, in this embodiment, an intermediate frequency band between a frequency band using an extended CP and a frequency band using a normal CP is disposed as a guard band not for transmitting a signal. That is, no signal is transmitted in the intermediate frequency band between the frequency band using the extended CP and the frequency band using the normal CP.

The transceiver is further configured to receive the signal according to the second configuration information of the CP length, and skip receiving the signal in a guard band in a particular subframe, where the second configuration information of the CP length is further used to indicate, to the user equipment, a location of the guard band not for transmitting the signal in the particular subframe, where the guard band is an intermediate frequency band between a frequency band using an extended CP and a frequency band using a normal CP, and the particular subframe is a subframe using both an extended CP and a normal CP.

Further, the transceiver is further configured to receive the signal in a last symbol of each timeslot in the particular subframe, where the guard band is not disposed in the last symbol of each timeslot in the particular subframe. As shown in FIG. 6C, no guard band exists in the last symbol of each timeslot in the particular subframe.

Still further, the second configuration information of the CP length is further used to indicate, to the user equipment, location information and/or bandwidth information of guard bands in different symbols in the particular subframe. As shown in FIG. 6D, in the last symbol of each slot in the particular subframe, bandwidth of a guard band is three subcarriers, but in other symbols, bandwidth of a guard band is five subcarriers.

Optionally, on a basis of the foregoing embodiment, the configuration signaling sent by the base station to the user equipment may be MBSFN subframe configuration signaling. Further, when the configuration signaling sent by the base station to the user equipment is the MBSFN subframe configuration signaling, configuration information of the cell in the MBSFN subframe configuration signaling may further include CRS transmission configuration information. The CRS transmission configuration information may be indicated by a particular state in states of the MBSFN subframe configuration signaling. For details, refer to descriptions in the embodiments corresponding to FIG. 3 and FIG. 4.

An embodiment of the present invention further provides an apparatus for sending information, where the apparatus includes:

a determining module, configured to determine multicast-broadcast single-frequency network MBSFN subframe configuration signaling according to a configuration of a cell, where the MBSFN subframe configuration signaling includes cell-specific reference signal CRS transmission configuration information, where the CRS transmission configuration information is used to indicate, to user equipment, a region for transmitting the CRS in a time domain; and a transceiver module, configured to send the MBSFN subframe configuration signaling to the user equipment; where the transceiver module is further configured to transmit a signal according to the CRS transmission configuration information.

For the above, refer to descriptions of the embodiment corresponding to FIG. 2.

Optionally, the transceiver module is further configured to transmit the CRS in a first-type subframe of the cell, and skip transmitting the CRS in a second-type subframe of the cell; and a particular state in states of the MBSFN subframe configuration signaling is used to indicate, to the user equipment, that the CRS is transmitted in the first-type subframe of the cell, and indicate, to the user equipment, that the CRS is not transmitted in the second-type subframe of the cell, where the first-type subframe and the second-type subframe are predefined or configured by the apparatus for the user equipment. For the above, refer to descriptions of the embodiment corresponding to FIG. 3.

Optionally, the transceiver module is further configured to transmit the CRS in a non-MBSFN subframe of the cell and in a non-MBSFN region of an MBSFN subframe of the cell;

and a particular state in the states of the MBSFN subframe configuration signaling is used to indicate, to the user equipment, that the CRS is transmitted in the non-MBSFN subframe of the cell and in the non-MBSFN region of the MBSFN subframe of the cell. Further, when a radio frame of the cell includes at least seven MBSFN subframes, the particular state in the states of the MBSFN subframe configuration signaling is indicated by a state value of the MBSFN subframe configuration signaling in which a radio frame allocation period is one radio frame and a radio frame allocation offset is not zero. For the above, refer to descriptions of the embodiment corresponding to FIG. 4.

An embodiment of the present invention further provides an apparatus for sending information, where the apparatus includes:

a determining module, configured to determine configuration signaling according to a configuration of a cell, where the configuration signaling includes configuration information of the cell, where the configuration information of the cell includes at least one of the following information: first configuration information of a cyclic prefix CP length or second configuration information of a CP length, where the first configuration information of the CP length is transmitted by using a system information block type 2 and used to indicate, to user equipment, configuration information of a subframe using an extended CP, and the second configuration information of the CP length is used to indicate, to the user equipment, configuration information of a frequency band using an extended CP and/or a frequency band using a normal CP in at least one subframe; and a transceiver module, configured to send the configuration signaling to the user equipment; where the transceiver module is further configured to transmit a signal according to the configuration information of the cell.

For the above, refer to descriptions of the embodiment corresponding to FIG. 5.

Optionally, the transceiver module is further configured to transmit the signal according to the second configuration information of the CP length and skip transmitting the signal in a guard band in the particular subframe, where the second configuration information of the CP length is further used to indicate, to the user equipment, a location of the guard band not for transmitting the signal in the particular subframe, where the guard band is an intermediate frequency band between a frequency band using an extended CP and a frequency band using a normal CP, and the particular subframe is a subframe using both an extended CP and a normal CP. Further, 61. in the apparatus according to claim 60, the transceiver module is further configured to transmit the signal in a last symbol of each timeslot in the particular subframe, where the guard band is not disposed in the last symbol of each timeslot in the particular subframe. Still further, the second configuration information of the CP length is further used to indicate, to the user equipment, location information and/or bandwidth information of guard bands in different symbols in the particular subframe. For the above, refer to descriptions of the embodiment corresponding to FIG. 6A.

Optionally, the configuration signaling is multicast-broadcast single-frequency network MBSFN subframe configuration signaling. Further, the configuration information of the cell further includes cell-specific reference signal CRS transmission configuration information, where the CRS transmission configuration information is used to indicate, to the user equipment, a region for transmitting a CRS in a time domain.

Further, the transceiver module is further configured to transmit the CRS in a first-type subframe of the cell, and skip transmitting the CRS in a second-type subframe of the cell; and a particular state in states of the MBSFN subframe configuration signaling is used to indicate, to the user equipment, that the CRS is transmitted in the first-type subframe of the cell, and indicate, to the user equipment, that the CRS is not transmitted in the second-type subframe of the cell, where the first-type subframe and the second-type subframe are predefined or configured by the apparatus for the user equipment. For the above, refer to descriptions of the embodiment corresponding to FIG. 3.

Further, the transceiver module is further configured to transmit the CRS in a non-MBSFN subframe of the cell and in a non-MBSFN region of an MBSFN subframe of the cell; and a particular state in the states of the MBSFN subframe configuration signaling is used to indicate, to the user equipment, that the CRS is transmitted in the non-MBSFN subframe of the cell and in the non-MBSFN region of the MBSFN subframe of the cell. When a radio frame of the cell includes at least seven MBSFN subframes, the particular state in the states of the MBSFN subframe configuration signaling is indicated by a state value of the MBSFN subframe configuration signaling in which a radio frame allocation period is one radio frame and a radio frame allocation offset is not zero. For the above, refer to descriptions of the embodiment corresponding to FIG. 4.

An embodiment of the present invention further provides an apparatus for receiving information, where the apparatus includes:

a transceiver module, configured to receive multicast-broadcast single-frequency network MBSFN subframe configuration signaling sent by a base station, where the MBSFN subframe configuration signaling includes cell-specific reference signal CRS transmission configuration information, where the CRS transmission configuration information is used to indicate, to the apparatus, a region for transmitting a CRS in a time domain; where the transceiver module is further configured to receive a signal according to the CRS transmission configuration information.

For the above, refer to descriptions of the embodiment corresponding to FIG. 8.

Optionally, the transceiver module is further configured to receive the CRS in a first-type subframe of the cell, and skip receiving the CRS in a second-type subframe of the cell; and a particular state in states of the MBSFN subframe configuration signaling is used to indicate, to the apparatus, that the CRS is transmitted in the first-type subframe of the cell, and indicate, to the apparatus, that the CRS is not transmitted in the second-type subframe of the cell, where the first-type subframe and the second-type subframe are predefined or configured by the apparatus for the apparatus. For the above, refer to descriptions of the embodiment corresponding to FIG. 9.

Optionally, the transceiver module is further configured to receive the CRS in a non-MBSFN subframe of the cell and in a non-MBSFN region of an MBSFN subframe of the cell; and a particular state in the states of the MBSFN subframe configuration signaling is used to indicate, to the apparatus, that the CRS is transmitted in the non-MBSFN subframe of the cell and in the non-MBSFN region of the MBSFN subframe of the cell. When a radio frame of the cell includes at least seven MBSFN subframes, the particular state in the states of the MBSFN subframe configuration signaling is indicated by a state value of the MBSFN subframe configuration signaling in which a radio frame allocation period is one radio frame and a radio frame allocation offset is not zero. For the above, refer to descriptions of the embodiment corresponding to FIG. 10.

An embodiment of the present invention further provides an apparatus for receiving information, where the apparatus includes:

a transceiver module, configured to receive configuration signaling sent by a base station, where the configuration signaling includes configuration information of a cell, where the configuration information of the cell includes at least one of the following information: first configuration information of a cyclic prefix CP length or second configuration information of a CP length, where the first configuration information of the CP length is transmitted by using a system information block type 2 and used to indicate, to the apparatus, configuration information of a subframe using an extended CP, and the second configuration information of the CP length is used to indicate, to the apparatus, configuration information of a frequency band using an extended CP and/or a frequency band using a normal CP in at least one subframe; where the transceiver module is further configured to receive a signal according to the configuration information of the cell.

For the above, refer to descriptions of the embodiment corresponding to FIG. 11.

Optionally, the transceiver module is further configured to receive the signal according to the second configuration information of the CP length, and skip receiving the signal in a guard band in a particular subframe, where the second configuration information of the CP length is further used to indicate, to the apparatus, a location of the guard band not for transmitting the signal in the particular subframe, where the guard band is an intermediate frequency band between a frequency band using an extended CP and a frequency band using a normal CP, and the particular subframe is a subframe using both an extended CP and a normal CP. Further, the transceiver module is further configured to receive the signal in a last symbol of each timeslot in the particular subframe, where the guard band is not disposed in the last symbol of each timeslot in the particular subframe. Still further, the second configuration information of the CP length is further used to indicate, to the apparatus, location information and/or bandwidth information of guard bands in different symbols in the particular subframe. For the above, refer to descriptions of the embodiment corresponding to FIG. 12.

Optionally, the configuration signaling is MBSFN subframe configuration signaling. Further, the configuration information of the cell further includes cell-specific reference signal CRS transmission configuration information, where the CRS transmission configuration information is used to indicate, to the apparatus, a region for transmitting a CRS in a time domain.

When the configuration information of the cell further includes the cell-specific reference signal CRS transmission configuration information, the transceiver module is further configured to receive the CRS in a first-type subframe of the cell, and skip receiving the CRS in a second-type subframe of the cell; and a particular state in states of the MBSFN subframe configuration signaling is used to indicate, to the apparatus, that the CRS is transmitted in the first-type subframe of the cell, and indicate, to the apparatus, that the CRS is not transmitted in the second-type subframe of the cell, where the first-type subframe and the second-type subframe are predefined or configured by the base station for the apparatus.

When the configuration information of the cell further includes the cell-specific reference signal CRS transmission configuration information, the transceiver module is further configured to receive the CRS in a non-MBSFN subframe of the cell and in a non-MBSFN region of an MBSFN subframe of the cell; and a particular state in the states of the MBSFN subframe configuration signaling is used to indicate, to the apparatus, that the CRS is transmitted in the non-MBSFN subframe of the cell and in the non-MBSFN region of the MBSFN subframe of the cell. Further, when a radio frame of the cell includes at least seven MBSFN subframes, the particular state in the states of the MBSFN subframe configuration signaling is indicated by a state value of the MBSFN subframe configuration signaling in which a radio frame allocation period is one radio frame and a radio frame allocation offset is not zero.

In the present invention, preferably, in a piece of MBSFN subframe configuration signaling, a state of the MBSFN subframe configuration signaling is used to provide an indication for the UE.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for sending information, comprising:
   determining, by a base station, multicast-broadcast single-frequency network MBSFN subframe configuration signaling according to a configuration of a cell, wherein the MBSFN subframe configuration signaling comprises cell-specific reference signal CRS transmission configuration information, wherein the CRS transmission configuration information is used to indicate, to user equipment, a region for transmitting the CRS in a time domain;
   sending, by the base station, the MBSFN subframe configuration signaling to the user equipment; and
   transmitting, by the base station, a signal according to the CRS transmission configuration information, wherein subframes of the cell comprise a first-type subframe and a second-type subframe, wherein the first-type subframe is configured and used to transmit the CRS, and the second-type subframe is configured and not used to transmit the CRS;
   that the CRS transmission configuration information is used to indicate, to user equipment, a region for transmitting the CRS in a time domain comprises: the CRS transmission configuration information is used to indicate, to the user equipment, that the CRS is transmitted in the first-type subframe of the cell, and indicate, to the user equipment, that the CRS is not transmitted in the second-type subframe of the cell; and the transmitting, by the base station, a signal according to the CRS transmission configuration information comprises:
  transmitting, by the base station, the CRS in the first-type subframe of the cell.

2. The method according to claim 1, wherein that the CRS transmission configuration information is used to indicate, to user equipment, a region for transmitting the CRS in a time domain comprises: the CRS transmission configuration information is used to indicate, to the user equipment, that the CRS is transmitted in a non-MBSFN subframe of the cell and in a non-MBSFN region of an MBSFN subframe of the cell; and
  the transmitting, by the base station, a signal according to the CRS transmission configuration information comprises:
  transmitting, by the base station, the CRS in the non-MBSFN subframe of the cell and in the non-MBSFN region of the MBSFN subframe of the cell.

3. A method for sending information, comprising:
  determining, by a base station, configuration signaling according to a configuration of a cell, wherein the configuration signaling comprises configuration information of the cell, wherein the configuration information of the cell comprises at least one of the following information: first configuration information of a cyclic prefix CP length or second configuration information of a CP length, wherein
  the first configuration information of the CP length is transmitted by using a system information block type 2 and used to indicate, to user equipment, configuration information of a subframe using an extended CP, and the second configuration information of the CP length is used to indicate, to the user equipment, configuration information of a frequency band using an extended CP and/or a frequency band using a normal CP in at least one subframe;
  sending, by the base station, the configuration signaling to the user equipment; and
  transmitting, by the base station, a signal according to the configuration information of the cell.

4. The method according to claim 3, wherein the second configuration information of the CP length is further used to indicate, to the user equipment, a location of a guard band not for transmitting the signal in a particular subframe, wherein the guard band is an intermediate frequency band between a frequency band using an extended CP and a frequency band using a normal CP, and the particular subframe is a subframe using both an extended CP and a normal CP; and
  the transmitting, by the base station, a signal according to the configuration information of the cell comprises:
  transmitting, by the base station, the signal according to the second configuration information of the CP length, and skipping transmitting the signal in the guard band in the particular subframe.

5. A method for receiving information, comprising:
  receiving, by user equipment, multicast-broadcast single-frequency network MBSFN subframe configuration signaling sent by a base station, wherein the MBSFN subframe configuration signaling comprises cell-specific reference signal CRS transmission configuration information, wherein the CRS transmission configuration information is used to indicate, to the user equipment, a region for transmitting a CRS in a time domain; and
  receiving, by the user equipment, a signal according to the CRS transmission configuration information, wherein subframes of the cell comprise a first-type subframe and a second-type subframe, wherein the first-type subframe is configured and used to transmit the CRS, and the second-type subframe is configured and not used to transmit the CRS;
  that the CRS transmission configuration information is used to indicate, to the user equipment, a region for transmitting the CRS in a time domain comprises: the CRS transmission configuration information is used to indicate, to the user equipment, that the CRS is transmitted in the first-type subframe of the cell, and indicate, to the user equipment, that the CRS is not transmitted in the second-type subframe of the cell; and
  the receiving, by the user equipment, a signal according to the CRS transmission configuration information comprises:
  receiving, by the user equipment, the CRS in the first-type subframe of the cell.

6. The method according to claim 5, wherein that the CRS transmission configuration information is used to indicate, to the user equipment, a region for transmitting the CRS in a time domain comprises: the CRS transmission configuration information is used to indicate, to the user equipment, that the CRS is transmitted in a non-MBSFN subframe of the cell and in a non-MBSFN region of an MBSFN subframe of the cell; and
  the receiving, by the user equipment, a signal according to the CRS transmission configuration information comprises:
  receiving, by the user equipment, the CRS in the non-MBSFN subframe of the cell and in the non-MBSFN region of the MBSFN subframe of the cell.

7. A method for receiving information, comprising:
  receiving, by user equipment, configuration signaling sent by a base station, wherein the configuration signaling comprises configuration information of a cell, wherein the configuration information of the cell comprises at least one of the following information: first configuration information of a cyclic prefix CP length or second configuration information of a CP length, wherein
  the first configuration information of the CP length is transmitted by using a system information block type 2 and used to indicate, to the user equipment, configuration information of a subframe using an extended CP, and the second configuration information of the CP length is used to indicate, to the user equipment, configuration information of a frequency band using an extended CP and/or a frequency band using a normal CP in at least one subframe; and
  receiving, by the user equipment, a signal according to the configuration information of the cell.

8. The method according to claim 7, wherein the second configuration information of the CP length is further used to indicate, to the user equipment, a location of a guard band not for transmitting the signal in a particular subframe, wherein the guard band is an intermediate frequency band between a frequency band using an extended CP and a frequency band using a normal CP, and the particular subframe is a subframe using both an extended CP and a normal CP; and
  the receiving, by the user equipment, a signal according to the configuration information of the cell comprises:

receiving, by the user equipment, the signal according to the second configuration information of the CP length, and skipping receiving the signal in the guard band in the particular subframe.

9. The method according to claim 7, wherein the configuration signaling is MBSFN subframe configuration signaling.

10. The method according to claim 9, wherein the configuration information of the cell further comprises cell-specific reference signal CRS transmission configuration information, wherein the CRS transmission configuration information is used to indicate, to the user equipment, a region for transmitting a CRS in a time domain.

11. The method according to claim 10, wherein the MBSFN subframe configuration signaling comprises n bits, wherein the n bits are used to indicate states of the MBSFN subframe configuration signaling, and n is a positive integer; and a particular state in the states of the MBSFN subframe configuration signaling is used to indicate the CRS transmission configuration information.

12. A base station, comprising:
a processor, configured to determine multicast-broadcast single-frequency network MBSFN subframe configuration signaling according to a configuration of a cell, wherein the MBSFN subframe configuration signaling comprises cell-specific reference signal CRS transmission configuration information, wherein the CRS transmission configuration information is used to indicate, to user equipment, a region for transmitting the CRS in a time domain; and
a transceiver, configured to send the MBSFN subframe configuration signaling to the user equipment; wherein
the transceiver is further configured to transmit a signal according to the CRS transmission configuration information, wherein subframes of the cell comprise a first-type subframe and a second-type subframe, wherein the first-type subframe is configured and used to transmit the CRS, and the second-type subframe is configured and not used to transmit the CRS;
that the CRS transmission configuration information is used to indicate, to user equipment, a region for transmitting the CRS in a time domain comprises: the CRS transmission configuration information is used to indicate, to the user equipment, that the CRS is transmitted in the first-type subframe of the cell, and indicate, to the user equipment, that the CRS is not transmitted in the second-type subframe of the cell; and
that the transceiver is further configured to transmit a signal according to the CRS transmission configuration information comprises:
the transceiver is further configured to transmit the CRS in the first-type subframe of the cell.

13. The base station according to claim 12, wherein that the CRS transmission configuration information is used to indicate, to user equipment, a region for transmitting the CRS in a time domain comprises: the CRS transmission configuration information is used to indicate, to the user equipment, that the CRS is transmitted in a non-MBSFN subframe of the cell and in a non-MBSFN region of an MBSFN subframe of the cell; and
that the transceiver is further configured to transmit a signal according to the CRS transmission configuration information comprises:

the transceiver is further configured to transmit the CRS in the non-MBSFN subframe of the cell and in the non-MBSFN region of the MBSFN subframe of the cell.

14. A base station, comprising:
a processor, configured to determine configuration signaling according to a configuration of a cell, wherein the configuration signaling comprises configuration information of the cell, wherein the configuration information of the cell comprises at least one of the following information: first configuration information of a cyclic prefix CP length or second configuration information of a CP length, wherein
the first configuration information of the CP length is transmitted by using a system information block type 2 and used to indicate, to user equipment, configuration information of a subframe using an extended CP, and the second configuration information of the CP length is used to indicate, to the user equipment, configuration information of a frequency band using an extended CP and/or a frequency band using a normal CP in at least one subframe; and
a transceiver, configured to send the configuration signaling to the user equipment; wherein
the transceiver is further configured to transmit a signal according to the configuration information of the cell.

15. The base station according to claim 14, wherein the second configuration information of the CP length is further used to indicate, to the user equipment, a location of a guard band not for transmitting the signal in a particular subframe, wherein the guard band is an intermediate frequency band between a frequency band using an extended CP and a frequency band using a normal CP, and the particular subframe is a subframe using both an extended CP and a normal CP; and
that the transceiver is further configured to transmit a signal according to the configuration information of the cell comprises:
the transceiver is further configured to transmit the signal according to the second configuration information of the CP length, and skip transmitting the signal in the guard band in the particular subframe.

16. The base station according to claim 14, wherein the configuration signaling is multicast-broadcast single-frequency network MBSFN subframe configuration signaling.

17. The base station according to claim 16, wherein the configuration information of the cell further comprises cell-specific reference signal CRS transmission configuration information, wherein the CRS transmission configuration information is used to indicate, to the user equipment, a region for transmitting a CRS in a time domain.

18. The base station according to claim 17, wherein the MBSFN subframe configuration signaling comprises n bits, wherein the n bits are used to indicate states of the MBSFN subframe configuration signaling, and n is a positive integer; and a particular state in the states of the MBSFN subframe configuration signaling is used to indicate the CRS transmission configuration information.

19. The base station according to claim 17, wherein subframes of the cell comprise a first-type subframe and a second-type subframe, wherein the first-type subframe is configured and used to transmit the CRS, and the second-type subframe is configured and not used to transmit the CRS;
that the CRS transmission configuration information is used to indicate, to the user equipment, a region for transmitting the CRS in a time domain comprises: the CRS transmission configuration information is used to indicate, to the user equipment, that the CRS is transmitted in the first-type subframe of the cell, and indicate, to the user equipment, that the CRS is not transmitted in the second-type subframe of the cell; and that the transceiver is further configured to transmit a signal according to the configuration information of the cell comprises:

the transceiver is further configured to transmit the CRS in the first-type subframe of the cell.

20. User equipment, comprising:

a transceiver, configured to receive multicast-broadcast single-frequency network MBSFN subframe configuration signaling sent by a base station, wherein the MBSFN subframe configuration signaling comprises cell-specific reference signal CRS transmission configuration information, wherein the CRS transmission configuration information is used to indicate, to the user equipment, a region for transmitting a CRS in a time domain; and the processor, configured to parse the MBSFN subframe configuration signaling; wherein the transceiver is further configured to receive a signal according to the CRS transmission configuration information, wherein subframes of the cell comprise a first-type subframe and a second-type subframe, wherein the first-type subframe is configured and used to transmit the CRS, and the second-type subframe is configured and not used to transmit the CRS;

that the CRS transmission configuration information is used to indicate, to the user equipment, a region for transmitting the CRS in a time domain comprises: the CRS transmission configuration information is used to indicate, to the user equipment, that the CRS is transmitted in the first-type subframe of the cell, and indicate, to the user equipment, that the CRS is not transmitted in the second-type subframe of the cell; and that the transceiver is further configured to receive a signal according to the CRS transmission configuration information comprises:

the transceiver is further configured to receive the CRS in the first-type subframe of the cell.

21. The user equipment according to claim 20, wherein that the CRS transmission configuration information is used to indicate, to the user equipment, a region for transmitting the CRS in a time domain comprises: the CRS transmission configuration information is used to indicate, to the user equipment, that the CRS is transmitted in a non-MBSFN subframe of the cell and in a non-MBSFN region of an MBSFN subframe of the cell; and that the transceiver is further configured to receive a signal according to the CRS transmission configuration information comprises:

the transceiver is further configured to receive the CRS in the non-MBSFN subframe of the cell and in the non-MBSFN region of the MBSFN subframe of the cell.

22. User equipment, comprising:

a transceiver, configured to receive configuration signaling sent by a base station, wherein the configuration signaling comprises configuration information of a cell, wherein the configuration information of the cell comprises at least one of the following information: first configuration information of a cyclic prefix CP length or second configuration information of a CP length, wherein the first configuration information of the CP length is transmitted by using a system information block type 2 and used to indicate, to the user equipment, configuration information of a subframe using an extended CP, and the second configuration information of the CP length is used to indicate, to the user equipment, configuration information of a frequency band using an extended CP and/or a frequency band using a normal CP in at least one subframe; and a processor, configured to parse the configuration signaling; wherein the transceiver is further configured to receive a signal according to the configuration information of the cell.

23. The user equipment according to claim 22, wherein the second configuration information of the CP length is further used to indicate, to the user equipment, a location of a guard band not for transmitting the signal in a particular subframe, wherein the guard band is an intermediate frequency band between a frequency band using an extended CP and a frequency band using a normal CP, and the particular subframe is a subframe using both an extended CP and a normal CP; and that the transceiver is further configured to receive a signal according to the configuration information of the cell comprises:

the transceiver is further configured to receive the signal according to the second configuration information of the CP length, and skip receiving the signal in the guard band in the particular subframe.

24. The user equipment according to claim 22, wherein the configuration signaling is MBSFN subframe configuration signaling.

25. The user equipment according to claim 24, wherein the configuration information of the cell further comprises cell-specific reference signal CRS transmission configuration information, wherein the CRS transmission configuration information is used to indicate, to the user equipment, a region for transmitting a CRS in a time domain.

26. The user equipment according to claim 25, wherein the MBSFN subframe configuration signaling comprises n bits, wherein the n bits are used to indicate states of the MBSFN subframe configuration signaling, and n is a positive integer; and a particular state in the states of the MBSFN subframe configuration signaling is used to indicate the CRS transmission configuration information.

27. The method according to claim 1, wherein the MBSFN subframe configuration signaling comprises n bits, wherein the n bits are used to indicate states of the MBSFN subframe configuration signaling, and n is a positive integer; and a particular state in the states of the MBSFN subframe configuration signaling is used to indicate the CRS transmission configuration information.

28. The base station according to claim 12, wherein the MBSFN subframe configuration signaling comprises n bits, wherein the n bits are used to indicate states of the MBSFN subframe configuration signaling, and n is a positive integer; and a particular state in the states of the MBSFN subframe configuration signaling is used to indicate the CRS transmission configuration information.

* * * * *